(12) United States Patent
Siebel et al.

(10) Patent No.: US 12,265,570 B2
(45) Date of Patent: Apr. 1, 2025

(54) GENERATIVE ARTIFICIAL INTELLIGENCE ENTERPRISE SEARCH

(71) Applicant: C3.ai, Inc., Redwood City, CA (US)

(72) Inventors: Thomas M. Siebel, Woodside, CA (US); Nikhil Krishnan, Los Altos, CA (US); Louis Poirier, Paris (FR); Michael Haines, San Francisco, CA (US); Romain Juban, San Francisco, CA (US)

(73) Assignee: C3.ai, Inc., Redwood City, CA (US)

( * ) Notice: Subject to any disclaimer, the term of this patent is extended or adjusted under 35 U.S.C. 154(b) by 0 days.

(21) Appl. No.: 18/542,481

(22) Filed: Dec. 15, 2023

(65) Prior Publication Data

US 2024/0202221 A1 Jun. 20, 2024

Related U.S. Application Data

(60) Provisional application No. 63/492,133, filed on Mar. 24, 2023, provisional application No. 63/446,792, (Continued)

(51) Int. Cl.
*G06F 16/34* (2019.01)
*G06F 16/33* (2019.01)
(Continued)

(52) U.S. Cl.
CPC ........ *G06F 16/345* (2019.01); *G06F 16/3326* (2019.01); *G06F 16/334* (2019.01);
(Continued)

(58) Field of Classification Search
CPC .. G06F 16/335; G06F 16/334; G06F 16/3326; G06F 16/338
See application file for complete search history.

(56) References Cited

U.S. PATENT DOCUMENTS 8,666,928 B2 3/2014 Tunstall-Pedoe
10,467,347 B1 11/2019 Reiter
(Continued)

OTHER PUBLICATIONS

Contextual AI, Inc., "Introducing RAG 2.0," Mar. 19, 2024 [retrieved online at contextual.ai/introducing-rag2].
(Continued)

*Primary Examiner* — Kannan Shanmugasundaram
(74) *Attorney, Agent, or Firm* — Ahmann Kloke LLP

(57) ABSTRACT

Systems and methods are configured to generate a set of potential responses to a prompt using one or more data models with data from at least a plurality of data domains of an enterprise information environment that includes access controls. A deterministic response is selected from the set of potential responses based on scoring of the validation data and restricting based on access controls in view of profile information associated with the prompt. These enterprise generative AI systems and methods support granular enterprise access controls, privacy, and security requirements, and provide traceable references and links to source information underlying the generative AI insights. These systems and methods enable dramatically increased utility for enterprise users to access information, analyses, and predictive analytics associated with and derived from a combination of enterprise and external information systems.

24 Claims, 13 Drawing Sheets

Related U.S. Application Data filed on Feb. 17, 2023, provisional application No. 63/433,124, filed on Dec. 16, 2022.

(51) Int. Cl.

| | | |
|---|---|---|
| *G06F 16/332* | (2019.01) | |
| *G06F 16/334* | (2025.01) | |
| *G06F 16/335* | (2019.01) | |
| *G06F 16/338* | (2019.01) | |
| *G06F 40/20* | (2020.01) | |
| *G06F 40/40* | (2020.01) | |
| *G06N 3/092* | (2023.01) | |
| *G06N 5/04* | (2023.01) | |
| *G06N 20/00* | (2019.01) | |

(52) U.S. Cl.
CPC ........ *G06F 16/3347* (2019.01); *G06F 16/335* (2019.01); *G06F 16/338* (2019.01); *G06F 40/20* (2020.01); *G06F 40/40* (2020.01); *G06N 3/092* (2023.01); *G06N 5/04* (2013.01); *G06N 20/00* (2019.01)

(56) References Cited

U.S. PATENT DOCUMENTS

| | | | |
|---|---|---|---|
| 10,621,282 B1 | 4/2020 | Selfridge | |
| 10,827,071 B1 | 11/2020 | Adibi | |
| 10,943,072 B1 | 3/2021 | Jaganmohan | |
| 11,138,473 B1 | 10/2021 | Padmanabhan | |
| 11,169,798 B1 | 11/2021 | Palmer | |
| 11,302,310 B1* | 4/2022 | Gandhe | G10L 15/065 |
| 11,516,158 B1 | 11/2022 | Luzhnica | |
| 11,783,805 B1 | 10/2023 | Nadig | |
| 11,900,289 B1 | 2/2024 | Kumar | |
| 11,908,476 B1 | 2/2024 | Lyu | |
| 2001/0053968 A1 | 12/2001 | Galitsky | |
| 2002/0099658 A1 | 7/2002 | Nielsen | |
| 2005/0154580 A1 | 7/2005 | Horowitz | |
| 2006/0294002 A1 | 12/2006 | Brett | |
| 2007/0055656 A1 | 3/2007 | Tunstall-Pedoe | |
| 2009/0292687 A1 | 11/2009 | Fan | |
| 2010/0332585 A1 | 12/2010 | Driesen | |
| 2011/0307435 A1 | 12/2011 | Overell | |
| 2014/0272884 A1* | 9/2014 | Allen | G06N 5/04 434/322 |
| 2017/0148434 A1 | 5/2017 | Monceaux | |
| 2017/0293666 A1* | 10/2017 | Ragavan | G06F 16/9024 |
| 2017/0293864 A1 | 10/2017 | Oh | |
| 2018/0081934 A1* | 3/2018 | Byron | G06F 40/40 |
| 2018/0191867 A1* | 7/2018 | Siebel | H04L 67/53 |
| 2018/0246983 A1 | 8/2018 | Rathod | |
| 2018/0314762 A1 | 11/2018 | Rathod | |
| 2018/0330258 A1* | 11/2018 | Harris | G06N 7/01 |
| 2018/0367483 A1 | 12/2018 | Rodriguez | |
| 2019/0034813 A1* | 1/2019 | Das | G06F 16/24522 |
| 2019/0121612 A1 | 4/2019 | Ashoori | |
| 2019/0132203 A1 | 5/2019 | Wince | |
| 2019/0179940 A1 | 6/2019 | Ross | |
| 2019/0251169 A1 | 8/2019 | Loghmani | |
| 2019/0266157 A1 | 8/2019 | Brown | |
| 2019/0272323 A1 | 9/2019 | Galitsky | |
| 2019/0361961 A1 | 11/2019 | Zambre | |
| 2020/0012584 A1 | 1/2020 | Walters | |
| 2020/0210647 A1 | 7/2020 | Panuganty | |
| 2021/0142177 A1 | 5/2021 | Mallya | |
| 2021/0158897 A1 | 5/2021 | Chatzou | |
| 2021/0173744 A1 | 6/2021 | Agrawal | |
| 2022/0027578 A1 | 1/2022 | Chorakhalikar | |
| 2022/0036153 A1 | 2/2022 | O'Malia | |
| 2022/0066914 A1 | 3/2022 | Drain | |
| 2022/0164109 A1 | 5/2022 | Hankins | |
| 2022/0237368 A1 | 7/2022 | Tran | |
| 2022/0261817 A1 | 8/2022 | Ferrucci | |
| 2022/0339781 A1 | 10/2022 | Weng | |
| 2022/0400094 A1 | 12/2022 | Sampath | |
| 2023/0131495 A1 | 4/2023 | Tater | |
| 2023/0177878 A1* | 6/2023 | Sekar | G06F 40/40 382/103 |
| 2024/0112394 A1 | 4/2024 | Neal | |
| 2024/0135199 A1 | 4/2024 | Portisch | |
| 2024/0320867 A1 | 9/2024 | Bean | |

OTHER PUBLICATIONS

Christidis, Angelos et al., "Serving Machine Workloads in Resource Constrained Environments: A Serverless Deployment Example," 2019 IEEE 12th Conference on Service-Oriented Computing and Applications (SOCA), pp. 55-63, Nov. 2019.

Lewis, Patrick et al., "Retrieval-Augmented Generation for Knowledge-Intensive NLP Tasks," Proceedings of the 34th International Conference on Neural Information Processing Systems, Dec. 6, 2020.

International Application No. PCT/US2023/084462, Search Report and Written Opinion dated Apr. 1, 2024.

International Application No. PCT/US2023/084465, Search Report and Written Opinion dated Apr. 11, 2024.

International Application No. PCT/US2023/084468, Search Report and Written Opinion dated Apr. 16, 2024.

International Application No. PCT/US2023/084481, Search Report and Written Opinion dated Mar. 25, 2024.

International Application No. PCT/US2023/084456, Search Report and Written Opinion dated Apr. 12, 2024.

\* cited by examiner

Generative AI Query

How might my brakes fail?

AI Summary  ⊙ Finished generating ▾

BRAKES MAY FAIL DUE TO LEAKAGE, WORN SEALS, UNEVEN WEAR ON THE PAD, INCORRECT ALIGNMENT, EXCESSIVE DISC THROW OR SHAFT DEFLECTION, OR ABNORMALLY HEAVY WEAR ON THE PAD.

FROM #1: THE BRAKE CALLIPERS ARE EMPTIED OF OIL AND THE TURBINE STARTS TO IDLE. (SEE THE HYDRAULIC DIAGRAM). AFTER APP. 24 HOURS THE BATTERY BACKUP OF THE CONTROLLER (UPS) HAS RUN OUT BUT THE TURBINE CONTINUES TO IDLE. WHEN THE ROTOR IS FULLY STOPPED AND THE BLADES ARE IN STOP POSITION THE ROTOR IS RELEASED FOR FREE IDLING. ALSO IN CASE OF GRID FAILURE, HOWEVER, IDLING IS NOT ALLOWED IN ALL TYPES OF STOP SITUATIONS (E.G. MANUAL STOP AND EMERGENCY STOP). FROM #2: FAIL SAFE OPERATION FOR FAIL SAFE OPERATIONS THE SWITCH SHOULD BE WIRED TO HAVE A SIGNAL CONNECTION WHEN EVERYTHING IS OK (I.E. CLOSING A NORMALLY OPEN SWITCH (NO)). THE CONNECTION SHOULD DISAPPEAR WHEN SWITCHING I.E. APPLYING THE BRAKE, HAVING WEAR OR IN CASE OF FAULTS LIKE BROKEN CABLE, POOR CONNECTIONS ETC. FROM #3: FOR FAIL-SAFE OPERATIONS THE SWITCH SHOULD BE WIRED TO HAVE A SIGNAL CONNECTION WHEN EVERYTHING IS OK (I.E. CLOSING A NORMALLY OPEN SWITCH (NO)). THE CONNECTION SHOULD DISAPPEAR WHEN SWITCHING I.E. APPLYING THE BRAKE, HAVING WEAR OR IN CASE OF FAULTS LIKE BROKEN CABLE, POOR CONNECTIONS ETC. FROM #4: MOTOR BRAKE WILL NOT LOOSEN. A CLICK SHOULD BE HEARD WHEN THE DIRECTION SWITCH IS OPERATED. A POOR MAIN CURRENT CONNECTION. B. DEFECT BRAKE COIL. C. DEFECT ELECTRIC VALVE. D. WORN BRAKE ROTOR. A. CHECK CABLES AND PLUGS. B. CHECK BRAKE COIL. C. CHECK THE ELECTRIC VALVE. D. SEND THE MOTOR FOR REPAIRS. FROM #5: LEAKAGE, WORN SEALS, UNEVEN WEAR ON PAD. THE BRAKE IS INCORRECTLY ALIGNED, EXCESSIVE DISC THROW OR SHAFT DEFLECTION, ABNORMALLY HEAVY WEAR ON PAD.

Sources:

1. acme-23-service-manual.pdf
2. acme-23-service-manual.pdf
3. acme-23-user-manual.pdf
4. acme-23-service-manual.pdf
5. acme-23-technical-manual.pdf

Generative AI Chat  ◻Expand

C3 AI  8:09 PM
What can I help you with? Feel free to ask a follow-up question.

john.doe@domain.com  8:09 PM
How often should I change my brake pads?

Status 8:09 PM   ⊙ Processing query ▾

Message goes here...

FIG. 2B

About 163 results

| Results | Sources | Types |
|---|---|---|
| C3 AI ESG - Net Zero Emissions Reduction Plan Dashboard ⧉ <br> The C3 AI Net Zero Emissions Reduction Plan dashboard provides an overview of the plan, including progress against targets. It provides an enterprise view of Scope 1, 2, and 3 emissions, associated trends, gaps to forecast, and associated mitigation activities. | C3.ai | Application |
| Resource Advisor - Monthly Utility Bill Summary ⧉ <br> Dashboard for monitoring utility bills and associated scope 1 and scope 2 GHG emissions across facilities. | Schneider Electric | Application |
| Tableau - CCS Monitoring Dashboard | Overview ⧉ <br> Dashboard for monitoring the operation of CCS operations across company operated power generation facilities as well as status of capital improvement projects to increase the volumes of carbon captured and sequestered. | Tableau | Application |
| GHG Protocol - Corporate Guidelines ⧉ <br> GHG Protocol guidelines provide the industry standard for carbon accounting methodology and the relevant data sources to achieve the most accurate emissions calculation possible. | GHG Protocol | Webpage |
| Sphera - Waste and Water Dashboards ⧉ <br> Dashboards for tracking waste generation and disposal and water usage at the levels of facility and sector. | Sphera | Application |
| CSV - Emissions-Audit-results-Q2-2023.csv ⧉ <br> Audit results for carbon emissions data from recent Q2 audit. | Microsoft365 | CSV |
| PDF - EmissionsDisclosure2022.pdf ⧉ <br> Last year's public emission disclosure which features data on the... | Microsoft365 | PDF |

↻ Regenerate answer

Message goes here...

FIG. 7B

GENERATIVE ARTIFICIAL INTELLIGENCE ENTERPRISE SEARCH

CROSS-REFERENCE TO RELATED APPLICATIONS

The present application claims the benefit of U.S. Provisional Patent Application Ser. No. 63/433,124 filed Dec. 16, 2022 and entitled "Unbounded Data Model Query Handling and Dispatching Action in a Model Driven Architecture," U.S. Provisional Patent Application Ser. No. 63/446,792 filed Feb. 17, 2023 and entitled "System and Method to Apply Generative AI to Transform Information Access and Content Creation for Enterprise Information Systems," and U.S. Provisional Patent Application Ser. No. 63/492,133 filed Mar. 24, 2023 and entitled "Iterative Context-based Generative Artificial Intelligence," each of which is hereby incorporated by reference herein.

TECHNICAL FIELD

This disclosure pertains to artificial intelligence and machine learning. More specifically, this disclosure pertains to generative artificial intelligence-based systems to transform information access and content creation for enterprise information systems.

BACKGROUND

Under conventional approaches, users are typically required to have technical expertise commensurate with the complexity designed into the computer system and/or the difficulty of the tasks the user is instructing the computer system to perform. Users may need to be familiar with capabilities, resources, and/or data availability of computer systems. This degrades the human-computer interaction. Advanced computing systems typically require user training and sophisticated users to understand the complexities of the system capabilities. Further, enterprise systems with complex interfaces raise the barriers for users to retrieve useful information and block access to utilize complex applications. Accordingly, enterprise systems and users cannot effectively or efficiently leverage enterprise data and applications.

SUMMARY

Disclosed herein are novel systems and methods to apply generative artificial intelligence to transform information access and content creation for enterprise systems. These enterprise generative AI systems and methods fundamentally change the human-computer interaction (HCI) model for enterprise software. These enterprise generative AI systems and methods combine user search with capabilities of natural language processing, generative AI, and predictive analysis that enable enterprise users to ask open-ended, multi-level, context specific questions. Enterprise generative AI can receive natural language input to process using machine learning to understand the request, identify and score relevant information, and empower information interactions in enterprise environments involving massive amounts of data and complex enterprise software.

These enterprise generative AI systems and methods provide maximum compatibility and adaptability across various deployment factors. Enterprise generative AI is deployable across different data domains (e.g., disparate data sources, categorized data, industry specific data, etc.) with external interfaces and APIs that can operate in both connected and non-connected computing environments. Enterprises running sensitive workloads in cloud-native, on premise, or air-gapped environments can implement enterprise generative AI to enable enterprise-wide collaboration and knowledge sharing with centralized, automated, and continuous indexing of critical knowledge across the entire corpus, or a subset thereof, of an enterprise's information systems. These enterprise generative AI systems and methods support granular enterprise access controls, privacy, and security requirements. Enterprise generative AI, as disclosed herein, provides traceable references and links to source information underlying the generative AI insights.

This innovation enables dramatically increased access for enterprise users to information, analyses, and predictive analytics associated with and derived from a combination of enterprise and external information systems. Aspects of the innovation enable enterprise and relevant external information to be easily accessible to a much broader range of users within the enterprise, such as untrained users, domain experts, senior managers, line workers, customers, etc. An intuitive natural language interface provides access to functionality of application specific interfaces, operations, and retrieval processes to automate and reduce user-executed steps. Enterprise users can interact with the enterprise generative AI through a variety of output formats and interfaces including: automated summary charts of critical information, AI-generated summary answers with references to sources, email briefs, alerts, generic content generation (e.g., proposals), a generative AI-powered chat interface, ranked list of top results, etc. The HCI can include simplified natural language interface as well as advanced accessibility features for adaptable forms of input including but not limited to voice, text, and menu controls.

A claimed solution rooted in computer technology overcomes problems specifically arising in the realm of computer technology. Various embodiments of the present disclosure include systems, methods, and non-transitory computer-readable media configured to receive a query. In an example implementation, multiple enterprise data sets, artificial intelligence applications, and data models from different data domains of an enterprise information environment are identified based on the query. A set of relevance scores is generated for different portions of the enterprise data sets that are determined based on the data models from the different data domains. Response information from the different data domains is determined by machine learning models such as a multimodal or a large language model based on the relevance scores and access control protocols. A natural language output is generated based on the response information from the relevant data domains.

BRIEF DESCRIPTION OF THE DRAWINGS

FIG. 2B depicts an example enterprise generative artificial intelligence response graphical user interface according to some embodiments.

FIG. 7A and FIG. 7B depict a diagram of an example enterprise generative artificial intelligence response graphical user interface according to some embodiments.

DETAILED DESCRIPTION

Figure 1:
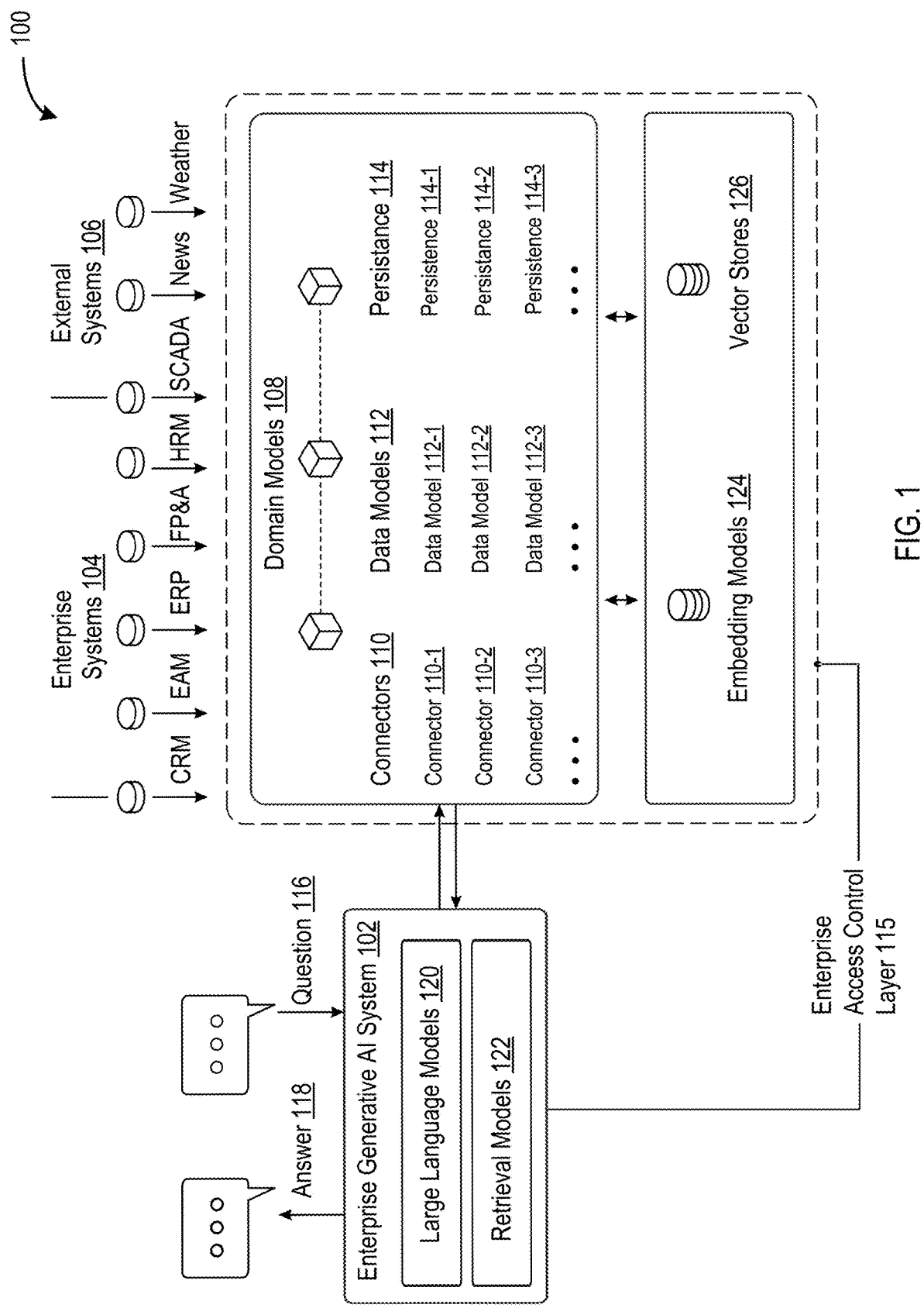
FIG. 1 depicts a diagram of an example enterprise generative artificial intelligence system architecture and flow according to some embodiments.

Enterprise environments typically have dozens if not hundreds of different applications with specifically designed user interfaces for accessing enterprise information. Each enterprise application can have a series of user interfaces that users must navigate to access operations and information. Some enterprise applications even have different user interfaces for different roles and operations, multiplying the potential permutations of steps a user must learn and perform to access enterprise information. Application user interfaces are typically designed to strike a balance between enabling operations of the application versus the learning curve required for user adoption. Although user interfaces can be designed to highlight and reduce navigation for frequent operations, the full utility of such enterprise applications becomes buried and complex to access without familiarity and/or training. Further, enterprise environments have a growing magnitude of data. Some AI enterprise platforms and applications have been successful at ingesting large amounts of disparate enterprise information by leveraging AI-based methods for predictive analytics such as anomaly detection, natural language processing (NLP), object detection, and forecasting. For example, the C3 AI Platform with C3 AI applications such as C3 AI Reliability, C3 AI Supply Chain, C3 AI Sustainability, C3 AI CRM, C3 AI ERP, C3 AI Defense, C3 AI Energy, provides flexibility in making fine-tuned decisions. As new enterprise applications are inevitably added to an enterprise environment, the user knowledge requirements to effectively use several legacy and emerging technologies to access information can become formidable.

In conventional computing systems, users are typically required to have technical expertise commensurate with the complexity designed into the computer system and/or the difficulty of the tasks the user is instructing the computer system to perform. Users may need to be familiar with capabilities, resources, and/or data availability of computer systems. This degrades the human-computer interaction. Advanced computing systems typically require user training and sophisticated users to understand the complexities of the system capabilities. Further, enterprise systems with complex interfaces raise the barriers for users to retrieve useful information and block access to utilize complex applications. For example, predictive analytical software applications generally require domain experts for execution of their sophisticated capabilities. Interaction with complex computer systems requires intuitive interfaces that enable a variety of users to effectively and quickly execute complex software functions while maintaining access, privacy, and security controls.

Aspects of this disclosure are directed to a framework for unifying information access methodologies and application operations across legacy and new enterprise applications and growing magnitude of data sources in enterprise environments. Systems and methods are described for harmonizing access to information and increasing availability to complex application operations while respecting enterprise security and privacy controls. The framework described herein uses machine learning techniques to navigate enterprise information and applications, comprehend organization specific context queues (e.g., acronyms, nicknames, jargon, etc.), and locate information most relevant to a request. Example aspects of the present disclosure lower the learning curve and reduce the steps a user must perform to access information, thereby democratizing usage of information currently blocked by complexities and domain expertise required by conventional enterprise information systems.

Enterprise information systems (or, simply, "enterprise systems") pose numerous technical challenges that have made them incompatible with conventional generative artificial intelligence solutions from both a technical standpoint and a user experience standpoint. For example, enterprise systems can store sensitive data, include a variety of disparate data sources and applications, operate in cloud-native, on premise, and air-gapped environments, and are accessed by different types of users with different enterprise permission levels and differing amounts of technical knowledge. Moreover, traditional enterprise information retrieval is slow, inefficient, unintuitive, unreliable, and inaccurate. Conventional generative artificial intelligence solutions do not address any of the problems posed by enterprise systems. Indeed, they typically exacerbate such problems. For example, conventional generative artificial intelligence solutions often provide unreliable or random responses that are presented as both reliable and accurate without any traceability or accountability. Conventional generative artificial intelligence solutions are also prone to hallucination and information leakage (e.g., because conventional generative artificial intelligence solutions cannot effectively separate enterprise data from the generative artificial intelligence models), and they cannot effectively leverage information across different data domains. Conventional generative artificial intelligence solutions also rely on specific generative artificial intelligence models that cannot be changed to address enterprise-specific requirements or address changes in an enterprise environment. These and other problems are addressed by the enterprise generative artificial intelligence systems, methods, architectures, and features discussed herein.

The systems, methods, architectures, and features enable an intuitive non-complex interface to rapidly execute complex user requests with improved access, privacy, and security enforcement. Implementations utilize generative AI techniques to enable responses to requests that are provided to users in an intuitive, non-complex manner. An enterprise comprehension module is used to understand the language, intent, and context of a user natural language query to discern relevant information from the enterprise information environment and generate deterministic responses.

Example aspects include systems and methods to implement machine learning models such as multimodal models, large language models (LLMs), and other machine learning models with enterprise grade integrity including access control, traceability, anti-hallucination, and data-leakage protections. Machine learning models can include some or all of the different types or modalities of models described herein (e.g., multimodal machine learning models, large language models, data models, statistical models, audio models, visual models, audiovisual models, etc.). Traceable functions enable the ability to trace back to source documents and data for every insight that is generated. Data protections elements protect data (e.g., confidential information) from being leaked or contaminating inherit model knowledge. The generative artificial intelligence systems provide a variety of features that specifically address the requirements and challenges posed by enterprise systems and environments. The enterprise generative artificial intelligence systems can securely, efficiently, and accurately use generative artificial intelligence methodologies, algorithms, and multimodal models (e.g., large language models and other machine learning models) to provide deterministic responses (e.g., in response to a natural language query and/or other instruction set) that leverage enterprise data across different data domains, data sources, and applications. Data can be stored and/or accessed separately and distinctly from the generative artificial intelligence models. The enterprise generative artificial intelligence systems prevent large language models of the generative artificial intelligence system from being trained using enterprise data, or portions thereof (e.g., sensitive enterprise data). This provides deterministic responses without hallucination or information leakage. The framework is adaptable and compatible with different large language models, machine-learning algorithms, and tools.

Access controls enforce restrictions imposed by administrative and/or security policies, profile rights, organizational controls, etc. Access controls can be implemented at various stages of the generative artificial intelligence to avoid being ingested by models, prompts, results, etc. For example, restricted data may be permitted to be ingested by the LLM but the results can be omitted, suppressed, masked, or abstracted in compliance with the access control policies. The enterprise generative artificial intelligence systems can use role-based access controls that can prevent users from receiving answers from the generative artificial intelligence system that include information that is not commensurate with their enterprise permissions.

The generative AI models interact with one or more of the one or more retrieval multimodal models. One or more retrieval models are used for understanding underlying data, documents, and applications of an enterprise information environment. Underlying data of the enterprise information environment can be embedded by an orchestration module, for example, by a model driven architecture for the conceptual representation of enterprise and external data sets for data virtualization and access control. Information presented with predictive analysis can include text summary, ranked results, smart cards, AI-powered chat interface, content generated on-the-fly, etc. The predictive analysis can be from one or more AI applications that include, for example, Supply Chain, CRM, ERP, Reliability, Defense, Sustainability, or Energy, etc. The generative artificial intelligence systems are deployable across cloud-native, on premise, and air-gapped environments, and the generative artificial intelligence models used by the systems can be easily and efficiently changed (or, "swapped"). Accordingly, these multimodal generative artificial intelligence systems are not restricted or locked into a particular type, format, or large language model once the system has been deployed in an enterprise environment. The multimodal generative artificial intelligence systems increases compatibility and accessibility of data across disparate data domains.

Moreover, enterprise generative artificial intelligence systems can also obtain and/or trigger artificial intelligence insights generated by enterprise artificial intelligence applications when determining responses. For example, in response to receiving a query (e.g., via an intuitive graphical user interface), the system can trigger one or more artificial intelligence applications to generate insights (e.g., based on enterprise data), and then provide a generative artificial intelligence-based deterministic response that includes a natural language summary of the insights as well as a traceability report indicating the source information used to determine the response. Accordingly, in this architecture, users and systems can safely and securely leverage enterprise data and applications, while also being able to trust the responses.

FIG. 1 depicts a diagram of an example enterprise generative artificial intelligence system architecture and environment 100 according to some embodiments. In the example of FIG. 1, the system architecture and environment 100 includes an enterprise generative artificial intelligence system 102, enterprise systems 104, external systems 106, domain models 108, a vector datastore 126, an embeddings models datastore 124, and an enterprise access control layer 115. In some embodiments, the query comprises a natural language query received through a graphical user interface. In some embodiments, the one or more enterprise data sets include any of documents, document segments, and insights generated by the one or more artificial intelligence applications. In some embodiments, each of the relevance scores is associated with a respective portion of the one or more enterprise data sets, wherein each of the relevance scores are determined relative to the other respective portions of the one or more enterprise data sets. In some embodiments, the systems, methods, and non-transitory computer readable media are further configured to perform generating a traceability analysis of the natural language output, the traceability analysis indicating any of the documents, the document segments, and the insights of the respective portions of the one or more enterprise data sets.

Each data model of the plurality of data models can correspond to a different data domain of the plurality of different data domains. In some embodiments, each data model represents respective relationships and attributes of the corresponding different data domain of the plurality of different data domains. The respective relationships and attributes include any of data types, data formats, and industry-specific information. In some embodiments, the natural language output comprises a summary of at least one of the respective portions of the one or more enterprise data sets associated with a relevance score.

Generally, the enterprise generative artificial intelligence system 102 can function to securely query and process enterprise data and applications across different domains of an enterprise information environment. This can be referred to as a generative enterprise search (or, simply, enterprise search). As shown, the enterprise generative artificial intelligence system 102 can receive a question 116 (e.g., input, a prompt, a natural language query, instruction, etc.). Generally, the enterprise generative artificial intelligence system 102 can process the query using large language models 120 and retrieval models 122. More specifically, the enterprise generative artificial intelligence system 102 can use the large language models 120 to interpret, understand and/or parse queries. The retrieval models 122 can interact with the large language models 120 and the domain models 108 to retrieve data records (e.g., documents, images, application outputs, artificial intelligence insights, objects, and the like) across different domains using data models 112 specific to each domain. Accordingly, the enterprise generative artificial intelligence system 102 can use the large language models 120, retrieval models 122, and the domain models 108 to generate an enterprise search result that is accurate, reliable, and secure.

The enterprise generative artificial intelligence system 102 can facilitate ingestion and persistence of enterprise system data from the enterprise systems 104 and/or external system data from the external systems 106 (e.g., systems outside of the enterprise information environment) using connectors 110, data models 112, and various persistent storage mechanisms and techniques 114. The enterprise systems 104 can include CRM systems, EAM systems, ERP systems, and/or the like, and the connectors can facilitate data ingestion from disparate data sources (e.g., Oracle systems, SAP systems, and/or the like). In some embodiments, the data models 112 provide attributes, relationships, and/or functions associated with a particular domain. For example, domains can include aerospace domains 112-1, energy domains 112-2, defense domains 112-3, and/or the like. The domain models 108 can enable the enterprise generative artificial intelligence system 102 to provide domain-specific results without comprising the security or the integrity of the underlying enterprise data, systems, and applications.

Furthermore, the enterprise generative artificial intelligence system 102 utilizes or manages an enterprise access control layer 115, which can provide numerous technological benefits. In some embodiments, the enterprise access control layer 115 facilitates the separation of underlying enterprise information (e.g., enterprise data, applications, systems) from the large language models 120 and/or other machine learning models of the enterprise generative artificial intelligence system 102. Accordingly, the enterprise generative artificial intelligence system 102 can provide domain-specific deterministic results without having to train the large language models 120 and/or other machine learning models on such enterprise information, which can cause the myriad of problems discussed above (e.g., information leakage, hallucination).

In some embodiments, the enterprise generative artificial intelligence system 102 can use the enterprise access control layer 115 to implement additional enterprise controls. For example, an enterprise information environment may include users and systems with different enterprise permission levels. The enterprise access control layer 115 can ensure that responses or output comply with access and security protocols. The enterprise generative artificial intelligence system 102 protects information so that a user is permitted to access data based on permissions, profiles, and controls. In one example, the enterprise access control layer 115 can filter information that is restricted by the retrieval model 122, prior to processing by the large language models 120, or presenting the answer or other output. More specifically, the enterprise access control layer 115 may filter data sources, data records, and/or other elements of an enterprise information environment such that query responses (or supporting traceability references) do not include information the user is not permitted to access.

The enterprise generative artificial intelligence system can also perform similar functionality based on the context of users and/or systems submitting the query. For example, a director and engineer may submit the same query (e.g., "what projects are past due?"), and the enterprise generative artificial intelligence system 102 can use contextual information (e.g., user role, permissions, domain associated with the user, and the like) to provide a response that is based on context both substantively (e.g., provide information on overdue projects for the particular requester) and/or with respect to presentation of the response (e.g., an engineer may receive more detailed technical information while a director may receive fewer technical details).

In some embodiments, the enterprise generative artificial intelligence system 102 can crawl, index, and/or map a corpus of data records (e.g., data records of one or more enterprise systems or environments) using contextual information (e.g., contextual metadata) along with data record embeddings to provide access control (e.g., role-based access), provide improved data record identification and retrieval, and map relationships between data records. In one example, contextual information may prevent some users from accessing (e.g., viewing, retrieving) certain data records, and improve similarity evaluations used in retrieval operation (e.g., of a generative artificial intelligence process).

In some implementations, the enterprise generative artificial intelligence system 102 can generate embeddings based on the embedding models of the embedding models datastore 124 and the content of the data records. In some implementations, the embeddings may be represented by one or more vectors that can be stored in the vector datastore 126. In some implementations, the retrieval models 122 can use the embeddings to retrieve relevant data records and perform similarity or relevance evaluations or other aspects of retrieval operations. As used herein, data records can include unstructured data records (e.g., documents and text data that is stored on a file system in a format such as PDF, DOCX, .MD, HTML, TXT, PPTX, image files, audio files, video files, application outputs, and the like), structured data records (e.g., database tables or other data records stored according to a data model or type system), timeseries data records (e.g., sensor data, artificial intelligence application insights), and/or other types of data records (e.g., access control lists).

Figure 2A:
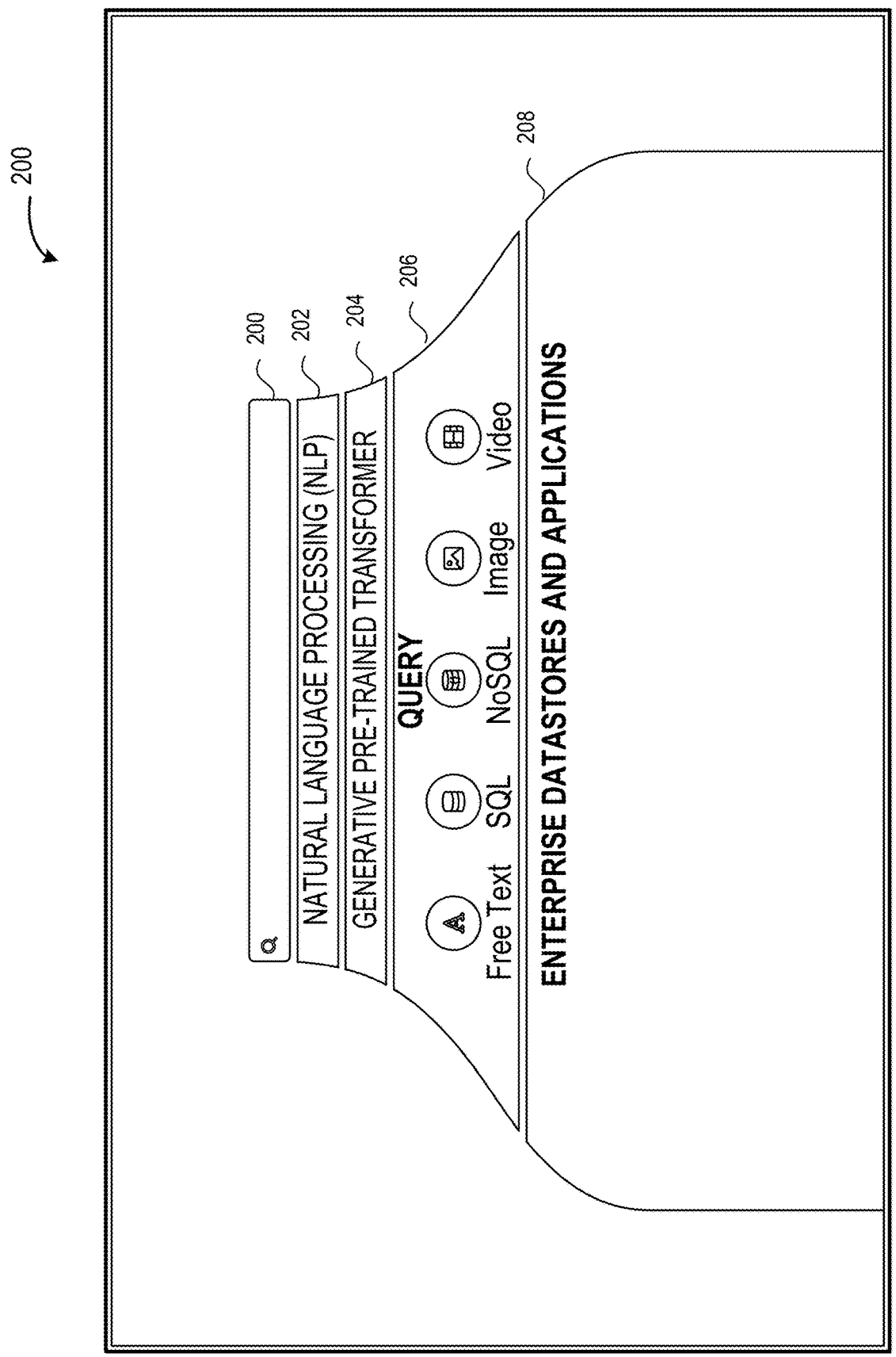
FIG. 2A depicts an example enterprise generative artificial intelligence query graphical user interface and architecture according to some embodiments.

FIG. 2A depicts an example enterprise search graphical user interface 200 and underlying architecture 202-208 according to some embodiments. Generally, the graphical user interfaces depicted in FIG. 2A and FIG. 2B include a human-computer interface for receiving natural language queries and presenting relevant information from the enterprise information environment in response to the queries. Although not shown in FIG. 2A or 2B, the relevant information can also include visualizations, predictive analysis, and/or other information obtained or generated by enterprise generative artificial intelligence systems.

In the example of FIG. 2A, the diagram includes an enterprise query input interface 200 and framework 202-208 for unifying information access methodologies and application operations across legacy and new enterprise applications and a growing magnitude of data sources in various enterprise environments. The enterprise generative artificial intelligence systems described herein can harmonize access to information and increase availability to complex application operations while respecting enterprise security and privacy controls. This framework uses machine learning techniques (e.g., generative artificial intelligence algorithms and models) to navigate enterprise information and applications, comprehend organization specific context queues (e.g., acronyms, nicknames, jargon, and the like), and locate information most relevant to a request (e.g., query). This can, for example, lower the learning curve and reduce the steps a user must perform to access information, thereby democratizing usage of information currently blocked by complexities and domain expertise required by conventional enterprise information systems.

In the example of FIG. 2A, the enterprise query input interface 200 comprises a graphical user interface element configured to receive various inputs, such as a natural language query. For example, a user may ask the system "How might my brakes fail?" and an enterprise generative artificial intelligence system can process the query with a natural language processing component 202 and one or more generative pre-trained transformers 204 (e.g., large language models and/or other machine learning models) to generate an answer securely, accurately, and reliably based on a variety of disparate enterprise datastores and applications 208. More specifically, the natural language processing component 202 and the generative pre-trained transformers 204 can generate one or more new queries 206 in order to process the initial user query. For example, a first new query may comprise an SQL query to retrieve data records from relational database management systems, and a second query may comprise another type of query (e.g., an instruction set) to execute one or more applications such that the result of that application execution can be returned and used by the system to generate the enterprise search response. An example enterprise search response interface is shown in FIG. 2B and described below.

In some embodiments, the enterprise search interfaces shown and described in FIGS. 2A and 2B can be generated by the enterprise generative artificial intelligence systems described herein, and the framework 202-208 can represent the enterprise generative artificial intelligence system architectures and environments described herein.

FIG. 2B depicts an example enterprise generative artificial intelligence response graphical user interface 250 according to some embodiments. In some embodiments, the enterprise generative artificial intelligence response graphical user interface 250 can be generated at least in part by the enterprise generative artificial intelligence systems described herein. In the example of FIG. 2B, the enterprise generative artificial intelligence response graphical user interface 250 includes an enterprise search query input portion 252, a generative enterprise search result portion 254, and an interactive query portion 256.

The enterprise search query input portion 252 presents an enterprise search query 258. In some implementations, the query can be input through the input portion 252, although it may also have been input in another interface (e.g., interface 200 shown in FIG. 2A) and presented in the input portion 252 as part of the generative enterprise search response.

The generative enterprise search result portion 254 includes a type of generative artificial intelligence response 260, a generative artificial intelligence response status 262, a generative artificial intelligence enterprise search result 266, source data portions 268 that were used the generate the response, source identifications 269, and generative artificial intelligence response feedback elements 270. In the example of FIG. 2B, the response type 260 is a summary, although there may be other response types that enterprise generative artificial intelligence systems can generate. The response status indicates the status of the response. Responses statuses can include, for example, processing query, processed query, evaluated metric, searched documents, generated answer (e.g., result), generated visualization (e.g., a time series visualization for presentation in a response graphical user interface), and/or finished generating (e.g., as shown in FIG. 2B).

The source data portions 268 include at least a portion of the information from the source data used to generate the response. This can, for example, enable a user to trust the response without having to independently verify the response. The source identifications 269 identify the source data records used to generate the response. For example, the source identifications can indicate an entity name, a domain type, a description or name of the data record (e.g., service manual, user manual, technical manual, and/or the like), and/or a type of data record (e.g., a document, or, more specifically, a PDF document), and/or the like. This can also provide traceability and enable the user to trust the response.

The response feedback portion 270 enables users to provide feedback regarding the response (e.g., positive or negative feedback). Enterprise generative artificial intelligence systems can, for example, use the received feedback to improve the enterprise generative artificial intelligence systems (e.g., through reinforcement learning).

The interactive query portion 256 enables users to input additional related queries (e.g., "follow-up" questions) through an interactive input portion 257. In the example of the FIG. 2B, the interactive query portion 256 comprises a chat interface, although other interfaces may use different interactive query portions. The interactive query portion 256 also includes a system generated message 274 prompting the user to ask follow-up questions, and users can provide additional related queries 276. The interactive query portion 256 can also include a status portion 278 indicating a process status of the additional related query 276. The status can include, for example, processing query (e.g., as shown in FIG. 2B), processed query, evaluated metric, searched documents, generated answer (e.g., result), generated visualization (e.g., a time series visualization for presentation in a response graphical user interface), and/or finished generating.

Time series refers to a list of data points in time order that can represent the change in value over time of data relevant to a particular problem, such as inventory levels, equipment temperature, financial values, or customer transactions. Time series provide the historical information that can be analyzed by generative and machine-learning algorithms to generate and test predictive models. Example implementations apply cleansing, normalization, aggregation, and combination, to time series data to represent the state of a process over time to identify patterns and correlations that can be used to create and evaluate predictions that can be applied to future behavior.

Figure 3:
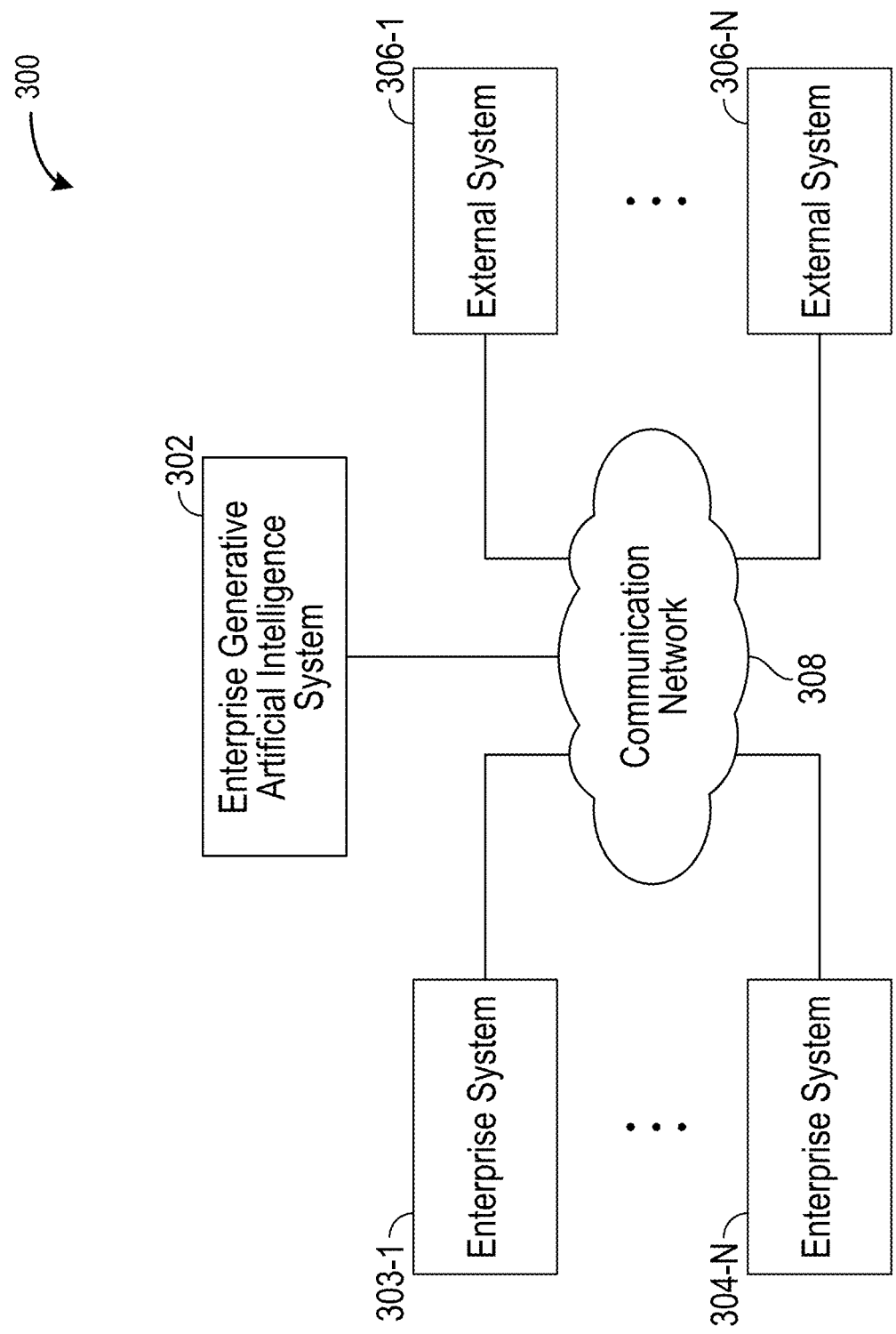
FIG. 3 depicts a diagram of an example network system for enterprise generative artificial intelligence according to some embodiments.

FIG. 3 depicts a diagram of an example network system 300 for generative enterprise search according to some embodiments. In the example of FIG. 3, the network system 300 includes an enterprise generative artificial intelligence system 302, enterprise systems 304-1 to 304-N (individually, the enterprise system 304, collectively, the enterprise systems 304), external systems 306-1 to 306-N (individually, the external system 306, collectively, the external systems 306), and a communication network 308.

The enterprise generative artificial intelligence system 302 can include some or all of the functionality described with reference to the enterprise generative artificial intelligence systems described herein (e.g., enterprise generative artificial intelligence system 102 and 400). For example, the enterprise generative artificial intelligence system 400 can leverage generative artificial intelligence techniques to enable and/or generate intuitive non-complex interfaces (e.g., as shown in FIG. 2A, FIG. 2B, FIG. 7A, and FIG. 7B) to rapidly execute complex user requests with improved access, privacy, and security enforcement.

The enterprise generative artificial intelligence system 302 can provide real-time and/or near real-time searching of a plurality of disparate systems using one or more transformer-based natural language machine learning models. For example, the enterprise generative artificial intelligence system 302 can use one or more pre-trained autoregressive language models and support distributed transactions. In some embodiments, the enterprise generative artificial intelligence system provides role-based search access to distributed enterprise data sets. The roles can define access privileges for portions of the distributed data sets, and roles can be set by the enterprise generative artificial intelligence system 302 based on input provided by one or more users (e.g., administrators and/or users that own or control a portion of the data set) and/or systems (e.g., machine learning-based systems). For example, a distributed data set may indicate levels of access and/or usage permissions (e.g., search, access, summary, raw content, and/or the like) required for portions of the distributed data set.

As discussed elsewhere herein, the enterprise generative artificial intelligence system 302 can provide numerous technical advantages relative to the prior art. For example, input queries that are executed by the system 302 can return results that would not have been identified by the initial user-supplied input query using traditional search techniques. Additionally, the results themselves may be different than what is stored in the distributed data sets (e.g., having a different format, type, or content) and public and private data can be selectively searched without unnecessarily exposing private data.

As described herein, applications can include, for example, Supply Chain, CRM, ERP, Reliability, Defense, Sustainability, Energy, and/or the like. Artificial intelligence applications can be capable of processing data pertaining to real-world systems, devices, scenarios, and/or the like, and analyzing the data to derive one or more insights. An example framework for integrating, processing, and abstracting data related to an enterprise logistics optimization development platform can include tools for machine learning, application development and deployment, data visualization, automated control and instruction, other tools (such as an integration component, a data services component, a modular services component, and an application that may be located on or behind an application module), and/or the like. The enterprise generative artificial intelligence system 302 can facilitate the design, development, provisioning, and operation of a platform for industrial-scale applications in various industries, such as energy industries, health or wearable technology industries, sales and advertising industries, transportation industries, communication industries, scientific and geological study industries, military and defense industries, financial services industries, healthcare industries, manufacturing industries, retail, government organizations, and/or the like. The system may enable integration and processing of large and highly dynamic data sets from enormous networks and large-scale information systems.

For example, supply chain data may be obtained from a first artificial intelligence application (e.g., an inventory management and optimization or supply chain application) and the impact information may be obtained based at least in part on the supply chain data and information from another artificial intelligence application, such as an artificial intelligence application used to monitor and predict maintenance needs for a fleet of vehicles. In the example, the supply chain data may indicate issues with the supply, another artificial intelligence application may be used to identify vehicles needing maintenance, and the impact information may represent an insight into how the vehicles needing maintenance are being impacted by issues in the supply chain (e.g., based on the supply chain data). Example information from different data domains or application objects may include key performance metrics (KPIs) (e.g., from left to right—a fleet readiness score, unscheduled maintenance avoided (hours) over a time period, a number of flights gained (e.g., due to avoided maintenance), operation time at risk, and/or the like), aircraft status risk score information, component risk score and ranking (e.g., by risk score) information, information associated with artificial intelligence alerts, flight capability information (e.g., by geographic region), case information, supply chain data, and impact information regarding aircraft being impacted by effects within the supply chain. The ability to obtain insights from one or more artificial intelligence applications and return those insights provides enhanced accessibility functionality. For example, such impact information may not be obtained from a supply chain application or maintenance application individually.

The enterprise systems 104 include enterprise applications (e.g., artificial intelligence applications), enterprise datastores, client systems, and/or other systems of an enterprise information environment. As used herein, an enterprise information environment can include one or more networks (e.g., on premise, air-gapped or otherwise) of enterprise systems (e.g., enterprise applications, enterprise datastores), and/or client systems (e.g., computing systems for access enterprise systems). An enterprise system includes disparate computing systems, applications, and/or datastores, along with enterprise-specific requirements and/or features. For example, enterprise systems include access and privacy controls. For example, a private network of an organization may comprise an enterprise information environment that includes various enterprise systems. Enterprise systems include CRM systems, EAM systems, ERP systems, FP&A systems, HRM systems, SCADA systems, and/or the like. Enterprise systems can include or leverage artificial intelligence applications and artificial intelligence applications may leverage enterprise systems and data. Enterprise systems can include data flow and management of different processes (e.g., of one or more organizations) and can provide access to systems and users of the enterprise while preventing access from other systems and/or users. It will be appreciated that, in some embodiments, references to enterprise information environments can also include enterprise systems, and references to enterprise systems can also include enterprise information environments.

The external systems 306 include applications, datastores, and systems that are external to the enterprise information environment. In one example, the enterprise systems 304 may be a part of an enterprise information environment of an organization that cannot be accessed by users or systems outside that enterprise information environment and/or organization. Accordingly, the example external systems 306 may include Internet-based systems, such as news media systems, social media systems, and/or the like, that are outside the enterprise information environment.

The communications network 308 may represent one or more computer networks (e.g., LAN, WAN, air-gapped network, cloud-based network, and/or the like) or other transmission mediums. The communication network 308 may provide communication between the systems, modules, layers, engines, datastores, and/or the like, described herein. In some embodiments, the communication network 308 includes one or more computing devices, routers, cables, buses, and/or other network topologies (e.g., mesh, and the like). In some embodiments, the communication network 308 may be wired and/or wireless. In various embodiments, the communication network 308 may include local area networks (LANs), wide area networks (WANs), the Internet, and/or one or more networks that may be public, private, IP-based, non-IP based, air-gapped, and so forth. Although not shown in the FIG. 1, it will be appreciated that the communication network 308, or other communication network including some or all of the functionality of communication network 308, may provide communication between the components of FIG. 1.

Figure 4:
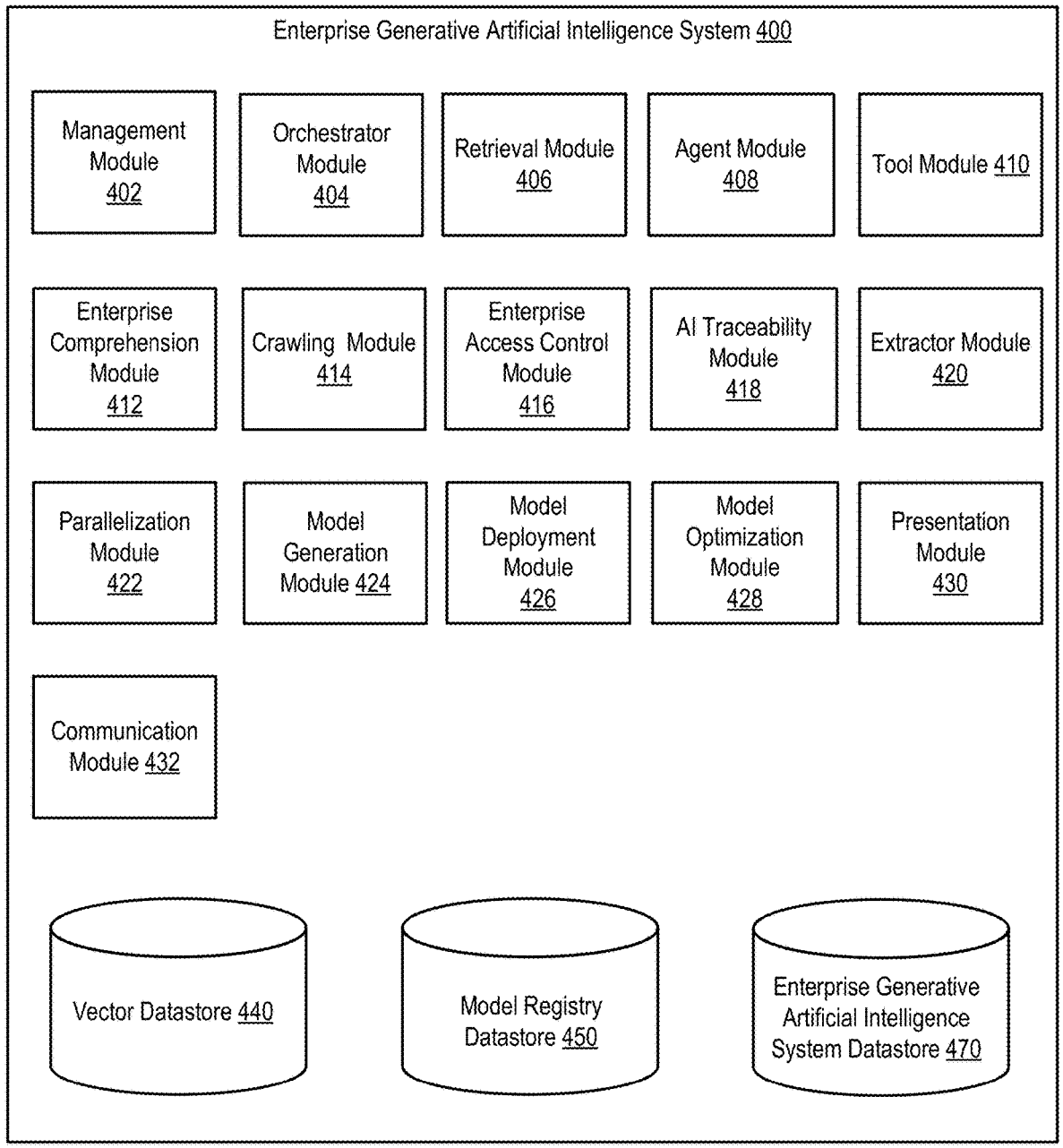
FIG. 4 depicts a diagram of an example of an enterprise generative artificial intelligence according to some embodiments.

FIG. 4 depicts a diagram of an example of an enterprise generative artificial intelligence system 400 according to some embodiments. The enterprise generative artificial intelligence system 400 may be the same as the enterprise generative artificial intelligence system 102 and/or 302. In the example of FIG. 4, the enterprise generative artificial intelligence system 400 includes a management module 402, an orchestrator module 404, a retrieval module 406, an agent module 408, a tool module 410, an enterprise comprehension module 412, a crawling module 414, an enterprise access control module 416, an artificial intelligence traceability module 418, an extractor module 420, a parallelization module 422, a model generation module 424, a model deployment module 426, a model optimization module 428, a presentation module 430, a communication module 432, vector datastore 440, model registry datastore 450, and enterprise generative artificial intelligence system datastore 470.

The management module 402 can function to manage (e.g., create, read, update, delete, or otherwise access) data associated with the enterprise generative artificial intelligence system 400. The management module 402 can store or otherwise manage or store in any of the datastores 440-470, and/or in one or more other local and/or remote datastores. It will be appreciated that the datastores can be a single datastore local to the enterprise generative artificial intelligence system 400 and/or multiple datastores remote to the machine learning-based device. In some embodiments, the datastores described herein comprise one or more local and/or remote datastores. The management module 402 can perform operations manually (e.g., by a user interacting with a GUI) and/or automatically (e.g., triggered by one or more of the modules 404-432). Like other modules described herein, some or all the functionality of the management orchestrator module 404 can be included in and/or cooperate with one or more other modules, systems, and/or datastores.

The orchestrator module 404 can function to generate and/or execute orchestrator agents (or, simply, orchestrators) that can manage, supervise, and/or otherwise orchestrate the components of the enterprise generative artificial intelligence system 400. In some embodiments, the orchestrator module 404 can function to execute and/or otherwise process various orchestration (or, supervisor) functions. For example, the orchestrator module 404 may enforce conditions (e.g., stopping, resource allocation, prioritization, and the like). For example, a stopping condition may indicate a maximum number of iterations (or, hops) that can be performed before the iterative process terminates. The stopping condition, and/or other features managed by the supervisor module, may be included in prompts. The stopping conditions ensure that the system will not get stuck in an endless loop, which allows the system the flexibility of having a different number of iterations for different inputs (e.g., as opposed to having a fixed number of hops). In another example, the supervisor module can perform resource allocation such as virtualization or load balancing based on computing conditions.

In an example implementation, the orchestrator module 404 creates one or more virtual metadata repositories across data stores, abstracts access to disparate data sources, and supports granular data access controls. The orchestrator module 404 can manage a virtual data lake with an enterprise catalogue that connects to multiple data domains and industry specific domains. The orchestrator module 404 is able to create embeddings for multiple data types across multiple industry verticals and knowledge domains, and even specific enterprise knowledge.

Embedding of objects in data domains of the enterprise information system enables rapid identification and complex processing with relevance scoring as well as additional functionality to enforce access, privacy, and security protocols. In some implementations, the orchestrator module 404 can employ a variety of embedding methodologies and techniques understood by one of ordinary skill in the art. In an example implementation, the orchestrator module can use a model driven architecture for the conceptual representation of enterprise and external data sets and optional data virtualization. For example, a model driven architecture can be as described in U.S. Pat. No. 10,817,530 issued Oct. 27, 2020, Ser. No. 15/028,340 with priority to Jan. 23, 2015 entitled "Systems, Methods, and Devices for an Enterprise Internet-of-Things Application Development Platform" by C3.ai, Inc. A type system of a model driven architecture can be used to embed objects of the data domains.

The type system provides data accessibility, compatibility and operability with disparate systems and data. Specifically, the type system solves data operability across diversity of programming languages, inconsistent data structures, and incompatible software application programming interfaces. The type system provides data abstraction that defines extensible type models that enables new properties, relationships and functions to be added dynamically without requiring costly development cycles. The type system can be used as a domain-specific language (DSL) within a platform used by developers, applications, or UIs to access data. The type system provides interactability with data to perform processing, predictions, or analytics based on one or more type or function definitions within the type system.

Type definitions can be a canonical type declared in metadata using syntax similar to that used by types persisted in the relational or NoSQL data store. A canonical model in the type system is a model that is application agnostic (i.e., application independent), enabling all applications to communicate with each other in a common format. Unlike a standard type, canonical types are comprised of two parts, the canonical type definition and one or more transformation types. The canonical type definition defines the interface used for integration and the transformation type is responsible for transforming the canonical type to a corresponding type. Using the transformation types, the integration layer may transform a canonical type to the appropriate type.

Types can define meta models and may be virtual building blocks to create new types, extend existing types, or write business logic on a type to dictate how data in the type will function when called. Logic in a platform can be expressed in JavaScript, which may allow APIs to be used to program against any type in the system. The type system generates composite types that include metadata from multiple layers. Composite types are used to construct or generate object instances for specific entities, functions etc. A composite type can include, for example, an entity definition, an application logic function, and one or UI view definitions. The composite type can be applied to data stored within one or more databases to create a specific instance of that type which can be used for processing by business logic.

The orchestrator module 404 can process data received from a variety of data sources in different formats that can be processed with natural language processing (NLP) (with tokenization, stemming, lemmatization, normalization, and/or the like) with vectorized data and can generate pre-trained transformers that are fine-tuned or re-trained on specific data tailored for an associated data domain or data application (e.g., SaaS applications, legacy enterprise applications, artificial intelligence applications). Further processing can include data modeling feature inspection and/or machine learning model simulations to select one or more appropriate analysis channels. Example data objects can include accounts, products, employees, suppliers, opportunities, contracts, locations, digital portals, geolocation manufacturers, supervisory control and data acquisition (SCADA) information, open manufacturing system (OMS) information, inventories, supply chains, bills of materials, transportation services, maintenance logs, and service logs.

The orchestrator module 404 can use a variety of components when needed to inventory or generate objects (e.g., components, functionality, data, and/or the like) using rich and descriptive metadata, to dynamically generate embeddings for developing knowledge across a wide range of data domains (e.g., documents, tabular data, insights derived from artificial intelligence applications, web content, or other data sources). In an example implementation, the orchestrator module 404 can leverage, for example, some or all of the components described herein. The orchestrator module 404 can facilitate storage, transformation, and communication to facilitate processing and embedding data. The orchestrator module 404 can create embeddings for multiple data types across multiple industry verticals and knowledge domains, and even specific enterprise knowledge. Knowledge may be modeled explicitly and/or learned by the retrieval model(s). In an example, the orchestrator module 404 generates embeddings that are translated or transformed for compatibility with a knowledge module. The orchestrator module 404 can be further configured to make different data domains operate or interface with the components of the enterprise generative artificial intelligence system 400. In one example, the orchestrator module 404 may embed objects from specific data domains as well as across data domains, applications, data models, analytical by-products, artificial intelligence predictions, and knowledge repositories to provide robust search functionality without requiring specialized programming for each different data domain or data source. For example, the orchestrator module 404 can create multiple embeddings for a single object (e.g., an object may be embedded in a domain-specific or application-specific context). The crawling module 414 (discussed below) along with the orchestrator module 404 can curate the data domains for embedding objects of the data domains in the enterprise information systems and/or environments.

The orchestrator module 404 can cause an agent to perform data modeling to translate raw source data formats into target embeddings (e.g., objects, types, and/or the like).

In an example implementation, the orchestrator module 404, and/or the enterprise generative artificial intelligence system 400 generally, employs a type system of a model-driven architecture to perform data modeling to translate raw source data formats into target types. A knowledge base of the enterprise generative artificial intelligence system 400 and generative artificial intelligence models can create the ability to integrate or combine insights from different artificial intelligence applications.

The retrieval module 406 can function to receive inputs, retrieve information from disparate data sources (e.g., from an embeddings index or vector store) in disparate data formats (e.g., data records, documents, database tables, API, machine learning-based insights, or other application output), and output information (e.g., the retrieved information, or a subset thereof). In some implementations, the retriever module comprises one or more machine learning models, such as deep learning models, neural network models, transformer-based models, and the like. The retriever module may also, in some implementations, generate outputs that are human-readable or machine-readable.

The retrieval artificial intelligence models can be trained with the knowledge modeling for interacting with the data sources. Model training can be implemented continuously, asynchronously, with feedback (e.g., re-enforcement learning, etc.), and the like. Multiple retrieval models can be trained on a single set of data for different use cases. The retrieval artificial intelligence models are multimodal for different types of data formats (e.g., text, images, video, and/or the like), data sources (e.g., databases, repositories, unstructured data, and/or the like), functions (e.g., enterprise departments, technology types, and/or the like), access classifications (e.g., permissive, restricted, confidential, and/or the like), and the like. Retrieval artificial intelligence models (or, simply, retrieval models) can enable intelligent identification, access, and comprehension for context specific information management.

The retrieval models can be trained and re-used across environments and/or re-trained for deeper context comprehension. For example, retrieval models trained on assessing confidential information can be re-trained for organization-specific acronyms, markings, project names, and/or the like to properly identify and assess access leveling. The relevance models with the orchestrator module 404 indexes and crawls data domains to develop embeddings for the retrieval models. The knowledge module creates a knowledge base of inference across ontologies of different data domains. At crawl time, the retrieval model collects data and pre-computes passage embeddings that are stored as pipelines in the knowledge base with traceability of the passage location of the data source. One or more retrieval models are used for understanding underlying data, documents, and applications of an enterprise information environment. Underlying data of the enterprise information environment can be embedded by an orchestrator module, for example, by a model driven architecture for the conceptual representation of enterprise and external data sets for data virtualization and access control. Information presented with predictive analysis can include text summary, ranked results, smart cards, AI-powered chat interface, content generated on-the-fly, and/or the like. The predictive analysis can be from one or more artificial intelligence applications that include, for example, Supply Chain, CRM, ERP, Reliability, Defense, Sustainability, or Energy, and/or the like.

At search time, language models are used to understand the request to create one or more queries for the retrieval model to retrieve results. In an example implementation, the retrieval model uses machine learning to return or more results in the embedded space based on relevance to the query. The enterprise comprehension module calls the knowledge base to generate new content based on inferences and insights of relevant data domains. The retrieval model employs large language models to embed a search query. A Demonstrate-Search-Predict method can be used to allow both the large language model and retrieval model to understand and generate natural language such that they interact to improve results quality.

The agent module 408 can function to generate (e.g., spin-up) and/or execute agents. In some implementations, agents can be controlled, supervised, and/or orchestrated by the orchestrator module 404. In some implementations, agents include reasoning functionality (e.g., through one or more large language models and/or other machine learning models) and control one more tools (e.g., retrieval tools). In some implementations, the agent module 408 performs some or all of the functionality of the retrieval module 406.

Agents may be associated with various tools and domains. This can also allow the enterprise generative artificial intelligence system 400 to more easily and efficiently employ more specific (e.g., domain-specific, industry-specific) models and generate more accurate and reliable results. For example, one agent (or group of agents) may process requests relating to one domain (e.g., aerospace), while another group of agents may process requests relating to a different domain (e.g., defense). This can be particularly useful for cross-domain queries (e.g., a single query or set of queries spanning multiple domains) and environments that may routinely process cross-domain inputs (e.g., military).

The tool module 410 can function to generate and/or execute different types of tools. For example, tools can include retrieval tools, code generation tools, image generation tools, and/or the like. Tools may include machine learning models (e.g., retrieval models) and/or can be controlled by one or more agents. In some implementations, tools do not include reasoning functionality but rather are instructed by agents and/or an orchestrator.

The enterprise comprehension module 412 can function to process inputs to determine output results (or, "answers"), determine rationales for answers, and determine whether the enterprise comprehension module 412 needs more information to determine answers. The enterprise comprehension module 412 may output information (e.g., answers or additional queries) in a natural language format. Features of one or more models of the enterprise comprehension module 412 define conditions or functions that determine if more information is needed to satisfy a query, or if there is enough information to satisfy the query and an accurate and reliable answer can be provided.

In some implementations, the enterprise comprehension module 412 comprises one or more large language models. The one or more large language models may be configured to generate and process context, as well as the other inputs and outputs described herein. The enterprise comprehension module 412 may also include one or more large language models that pre-process queries. For example, the enterprise comprehension module 412 can parse a complex input into multiple segments, and generate new corresponding queries, which the enterprise comprehension module 412 can route to various agents for processing. The enterprise comprehension module 412 may also include one or more large language models that processes outputs from other models and modules. The enterprise comprehension module 412 may also include another large language model for processing results into a format more consistent with an answer. The enterprise comprehension module 412 can also notify users and systems if it cannot find an answer (e.g., as opposed to presenting an answer that is likely faulty or biased).

The enterprise comprehension module 412 can generate and store rationales and context. A rationale, in one example, is the reasoning used by the enterprise comprehension module 412 to determine a result (e.g., natural language answer, an indication that it needs more information, or an indication that it can satisfy the initial input). In some implementations, the enterprise comprehension module 412 can generate context based on the rationale. For example, the context can include a concatenation and/or annotation of one or more data records (or segments of data records), and/or embeddings associated therewith, along with a mapping of the concatenations and/or annotations. For example, the mapping may indicate relationships between different data records (or segments of data records), a weighted or relative value associated with the different data records (or segments), and/or the like.

In some implementations, the enterprise comprehension module 412 processes inputs to determine one or more results (i.e., output, response, or answer), determine rationales for results, and determine whether the enterprise comprehension module 412 needs more information to determine results. Enterprise comprehension module 412 may output information (e.g., results, new prompts, or additional queries) in a natural language format. In some implementations, features of one or more models of the enterprise comprehension module 412 can define conditions or functions that determine if more information is needed to satisfy the initial input or if there is enough information to satisfy the initial input. In some implementations, the enterprise comprehension module 412 comprises one or more large language models.

The enterprise comprehension module 412 executes a query (e.g., natural language query) to discern relevant information from an enterprise information environment to present to the human-computer interface. In some embodiments, the enterprise comprehension module 412 includes generative artificial intelligence models (e.g., large language models) that can interact with one or more of the one or more other models (e.g., data models, retrieval models) and a knowledge base to discern critical information from the relevant data domains and objects in order to respond to requests and generate new insight content.

In some embodiments, the enterprise comprehension module 412 comprises a reasoning engine that determines the intent of a query and constructs of a request that interacts with one or more retrieval models of the retrieval module 406 to locate and synthesize data. The enterprise comprehension module 412 and retrieval models may execute a series of interactions for a complex multi-level request to iteratively develop context-specific constructs that are responsive to the request. For example, in responding to a request, the enterprise comprehension module 412 may infer that a category of data is needed and request a specific retrieval model to retrieve data of the inferred category. The enterprise comprehension module 412 can then synthesize the retrieved data and make a further inference for a different category or data source and request a different retrieval model to retrieve data for the further inferred category or data source. The interactive sequence of inference, retrieval, and synthesis between the enterprise comprehension modules and retrieval artificial intelligence models can repeat numerous times (or multi-hops) to develop one or more relevant responses to a request. In some implementations, an orchestrator can control, regulate, or limit the interactive sequence between the enterprise comprehension modules and retrieval models to ensure performance or confidence thresholds. In some implementations, the retrieval models can instruct the orchestrator module 404 for information virtualization and access control.

The enterprise comprehension module 412 can respond to, and/or otherwise process queries (e.g., natural language requests) and provide context specific information from a variety of enterprise applications. The enterprise comprehension modules are capable of discerning and deconstructing complex context specific requests. For example, a natural language request that asks "Are my ESG goals on track?" can discern the enterprise specific ESG goals, interpret 'on track' as a time based progress metric towards the ESG goals, retrieve and process data from enterprise systems including relevant ESG data from an artificial intelligence application, synthesize information that can include images, text, artificial intelligence models, and/or the like, to make one or more determinations or predictions, and generate new content based on the synthesizing of the retrieved content to address the request. In some examples, the enterprise generative artificial intelligence system 400 may use external data to complement or discern and/or synthesize the request.

The enterprise comprehension modules 412 can cooperate with retrieval artificial intelligence models of the retrieval module 406 to learn enterprise-specific context to synthesize information from the knowledge base as well as external data sources. The enterprise comprehension modules can synthesize results from multiple locations using generative large language models. The enterprise comprehension module 412 can employ generative artificial intelligence models, large language models, parameter injection, and machine-learning techniques. The enterprise comprehension modules enable responding to complex requests (e.g., multi-hop, multi-level, inference, insights, and/or the like). The enterprise comprehension modules can apply slotting techniques to deconstruct specific queues or indicators and determine context markers to apply specific inferences for synthesis (e.g., enterprise, application, request types, requestor type, subject matter, interaction format, and/or the like).

The crawling module 414 can crawl and index a corpus of data records (e.g., data records of one or more enterprise systems) using contextual information (e.g., contextual metadata) along with data record embeddings to provide access control (e.g., role-based access), provide improved data record identification and retrieval, and map relationships between data records. In one example, contextual information may prevent some users from accessing (e.g., viewing, retrieving) certain data records, and improve similarity evaluations used in retrieval operation (e.g., of a generative artificial intelligence process).

In some implementations, the crawling module 414 can generate embeddings based on data records and/or segments. The embeddings may be generated based on one or more embedding models. In some implementations, the embeddings may be represented by one or more vectors that can be stored in the vector datastore 440. The embeddings may be used when retrieving data records and performing similarity or relevance evaluations or other aspects of retrieval operations.

The crawling module 414 curates (or, "crawls") different data domains in cooperation with the orchestrator module 404 to embed objects of the data domains in the enterprise generative artificial intelligence system 400, and/or associated enterprise systems, data sources, and/or the like. In some embodiments, the enterprise comprehension module 412 implements and/or utilizes knowledge modeling. In one example, knowledge modeling (or, "mapping") understands the enterprise context and understands the semantics and models for enterprise concepts, features, and components. Knowledge modeling can utilize data virtualization capabilities and continuous data processing, as well as artificial intelligence and machine learning techniques. In some embodiments, knowledge is modeled explicitly, and/or learned by the retrieval models. The crawling module 414 can couple conceptual domains and industry models (e.g., data models) with the retrieval models of the retrieval module 406 to embed and learn task-specific and organization specific phrases, text, images, abbreviations, acronyms, jargon, and the like. The crawling module 414, or knowledge base thereof, can curate or crawl enterprise information systems and develop inferences across different data domains. Knowledge modeling can be performed to curate domain metadata, crawl and index data sources, as well as employ virtualization to get information (e.g., data objects). In some implementation, the orchestrator module 404 can be used to perform embeddings for information and/or data objects of data sources.

In some embodiments, indexing and embedding operations learn data object semantics to develop enterprise concepts and inferences. Crawling data domains can map databases and structured data to a type system. Knowledge modeling can also track access, security, and privacy characteristics for each piece of information, data object, data source, and the like. In some embodiments, the crawling module 414 can perform the embedding operations discussed herein.

The enterprise access control module 416 can function to provide enterprise access controls (e.g., layers and/or protocols) for the enterprise generative artificial intelligence system, associated systems (e.g., enterprise systems), and/or environments (e.g., enterprise information environments). The enterprise access control module 416 can provide functionality for enforcement of access control policies with respect to generating search results and search results that have already been generated.

The enterprise access control module 416 evaluates whether a user is authorized to access all or only a portion of the search results. For example, a user can provide a query associated with a first department or sub-unit of an organization. Members of that department or sub-unit may be restricted from accessing certain pieces of data, types of data, data models, or other aspects of a data domain in which a search is to be performed. Where the initial search results include data for which access by the user is restricted, the enterprise access control module 416 can determine how such restricted data is to be handled, such as to omit the restricted data entirely, omit the restricted data but indicate the search results include data for which access by the user is restricted, or provide information related to all of the initial search results. In the example where restricted data is omitted entirely, a final set of search results may be returned for presentation to the user, where the final set of search results does not inform the user that a portion of the initial search results have been omitted. In the example where the restricted data is omitted but an indication of the presence of the restricted data is provided to the user, the final search results may include only those search results for which the user is authorized for access, but may include information indicating there were X number of initial search results but only Y search results are outputted, where $Y<X$. In the third example described above, all of the search results may be outputted to the user, including search results for which access is restricted by the user. Additionally, or alternatively, the enterprise access control module 416 may communicate with one or more other modules to obtain information that may be used to enforce access permissions/restrictions in connection with performing searches instead of for controlling presentation of the results to the user. For example, enterprise access control module 416 may restrict the data sources to which the search is applied, such as to not apply the search to portions of the data sources for which user access is denied and apply the search to portions of the data sources for which user access is permitted. It is noted that the exemplary techniques described above for enforcing access restrictions in connection with performing searches within a search domain have been provided for purposes of illustration, rather than by way of limitation, and it should be understood that query modules operating in accordance with embodiments of the present disclosure may implement other techniques to present search results via an interface based on access restrictions.

In some embodiments, to facilitate the enforcement of access restrictions in connection with searches performed by the enterprise generative artificial intelligence system 400, the enterprise access control module 416 may store information associated with access restrictions or permissions for each user. To retrieve the relevant restriction data for a user, the enterprise access control module 416 may receive information identifying the user in connection with the input or upon the user logging into the platform on which the enterprise access control module 416 is executing. The enterprise access control module 416 may use the information identifying the user to retrieve appropriate restriction data for supporting enforcement of access restrictions in connection with an enterprise search. In some embodiments, the enterprise access control module 416 can include credential management functionality of a model driven architecture in which the enterprise generative artificial intelligence system 400 is deployed or may be a remote credential management system communicatively coupled to the enterprise generative artificial intelligence system 400 via a network.

The artificial intelligence traceability module 418 can function to provide traceability and/or explainability of answers generated by the enterprise generative artificial intelligence system 400. For example, the artificial intelligence traceability module 418 can indicate portions of data records used to generate the answers and their respective data sources.

The extractor module 420 can function to process, extract and/or transform different types of data (e.g., text, database tables, images, video, code, and/or the like). For example, the extractor module 420 may take in a database table as input and transform it into natural language describing the database table which can then be provided to the orchestrator module 404, which can then process that transformed input to "answer," or otherwise satisfy a query. In some implementations, the extractor module 420 comprises one or more large language models and one or more other types of machine learning or natural language models. For example, a large language model may be used to process text, while another model may be used to convert (or, transform) an image, database table, and/or other non-text input, into text format (e.g., natural language).

The parallelization module 422 can function to control the parallelization of the various systems, modules, agents, models, and processes described herein. For example, the parallelization module 422 may spawn parallel executions of different agents and/or orchestrators. The parallelization module 422 may be controlled by the orchestrator module 404.

The model generation module 424 can function to generate and/or modify some or all of the different types of models described herein (e.g., machine learning models, large language models, data models). In some implementations, the model generation module 424 can use a variety of machine learning techniques or algorithms to generate models. As used herein, machine learning can include Bayesian algorithms and/or models, deep learning algorithms and/or models (e.g., artificial neural networks, convolutional neural networks), gap analysis algorithms and/or models, supervised learning techniques and/or models, unsupervised learning algorithms and/or models, random forest algorithms and/or models, similarity learning and/or distance algorithms, generative artificial intelligence algorithms and models, and/or the like.

The model deployment module 426 can function to deploy some or all of the different types of models described herein. In some implementations, the model deployment module 426 can deploy models before or after a deployment of an enterprise generative artificial intelligence system. For example, the model deployment module 426 may cooperate with the model optimization module 428 to swap or otherwise change large language models of an enterprise generative artificial intelligence system. The model optimization module 428 can function to obtain user feedback (e.g., regarding the final result/answer). For example, the supervisor module may train (or re-train) one or more models of the iterative context-based generative artificial intelligence system based on user feedback.

In some embodiments, the model optimization module 428 can change out models of the iterative context-based generative artificial intelligence system at or during run-time in addition to before or after run-time. For example, the retriever module and/or the context-based enterprise comprehension module may use particular sets of machine learning models for one domain and other models for different domains. The model swapping module may select and use the appropriate models for a given domain. This may even occur during the iteration process. For example, as new queries are generated by the context-based enterprise comprehension module, the domain may change which may trigger the model swapping module to select and deploy a different model that is appropriate for that domain.

In some embodiments, the model optimization module 428 can train generative artificial intelligence models to develop different types of responses (e.g., best results, ranked results, smart cards, chatbot, new content generation, and/or the like).

The model optimization module 428 can tune some or all of the models described herein, including models of the enterprise comprehension modules (e.g., large language models). For example, the model optimization module 428 may tune generative artificial intelligence models based on tracking user interactions within the system, by capturing explicit feedback (e.g., through a training user interface), implicit feedback, and/or the like In some example implementations, a reinforcement learning module can optionally be used to accelerate knowledge base bootstrapping. Reinforcement learning can be used for explicit bootstrapping of the system with instrumentation of time spent, results clicked on, and the like. Example aspects can include an innovative learning framework that can bootstrap models for different enterprise environments.

In some embodiments, the model optimization module 428 can retrain the transformer-based natural language machine learning models periodically, on-demand, and/or in real-time. In some example implementations, corresponding candidate transformer-based natural language machine learning models can be trained based on the user selections and the system can replace some or all of the transformer-based natural language machine learning models with one or more candidate transformer-based natural language machine learning models that have been trained on the received user selections.

The presentation module 430 can function to generate graphical user interface components (e.g., server-side graphical user interface components) that can be rendered as complete graphical user interfaces on other systems. For example, the presentation module 460 can function to present an interactive graphical user interface for displaying and receiving information. For example, the presentation module 430 can generate graphical user interface enterprise search query input and response interfaces (e.g., as shown in FIG. 2A, FIG. 2B, FIG. 7A, and FIG. 7B).

The communication module 432 can function to send requests, transmit and receive communications, and/or otherwise provide communication with one or more of the systems, modules, engines, layers, devices, datastores, and/or other components described herein. In a specific implementation, the communication module 432 may function to encrypt and decrypt communications. The communication module 432 may function to send requests to and receive data from one or more systems through a network or a portion of a network (e.g., communication network 308). In a specific implementation, the communication module 432 may send requests and receive data through a connection, all or a portion of which can be a wireless connection. The communication module 432 may request and receive messages, and/or other communications from associated systems, modules, layers, and/or the like. Communications may be stored in the enterprise generative artificial intelligence system datastore 470.

The model registry datastore 450 can function to store different models and/or model configurations. For example, the model registry may store different configurations of various large language models (e.g., which can be deployed or swapped in an enterprise generative artificial intelligence system). The enterprise generative artificial intelligence system 400 includes some or all of the functionality of the enterprise generative artificial intelligence systems described herein (e.g., enterprise generative artificial intelligence systems 102 and/or 302) and/or vice versa.

Figure 5:
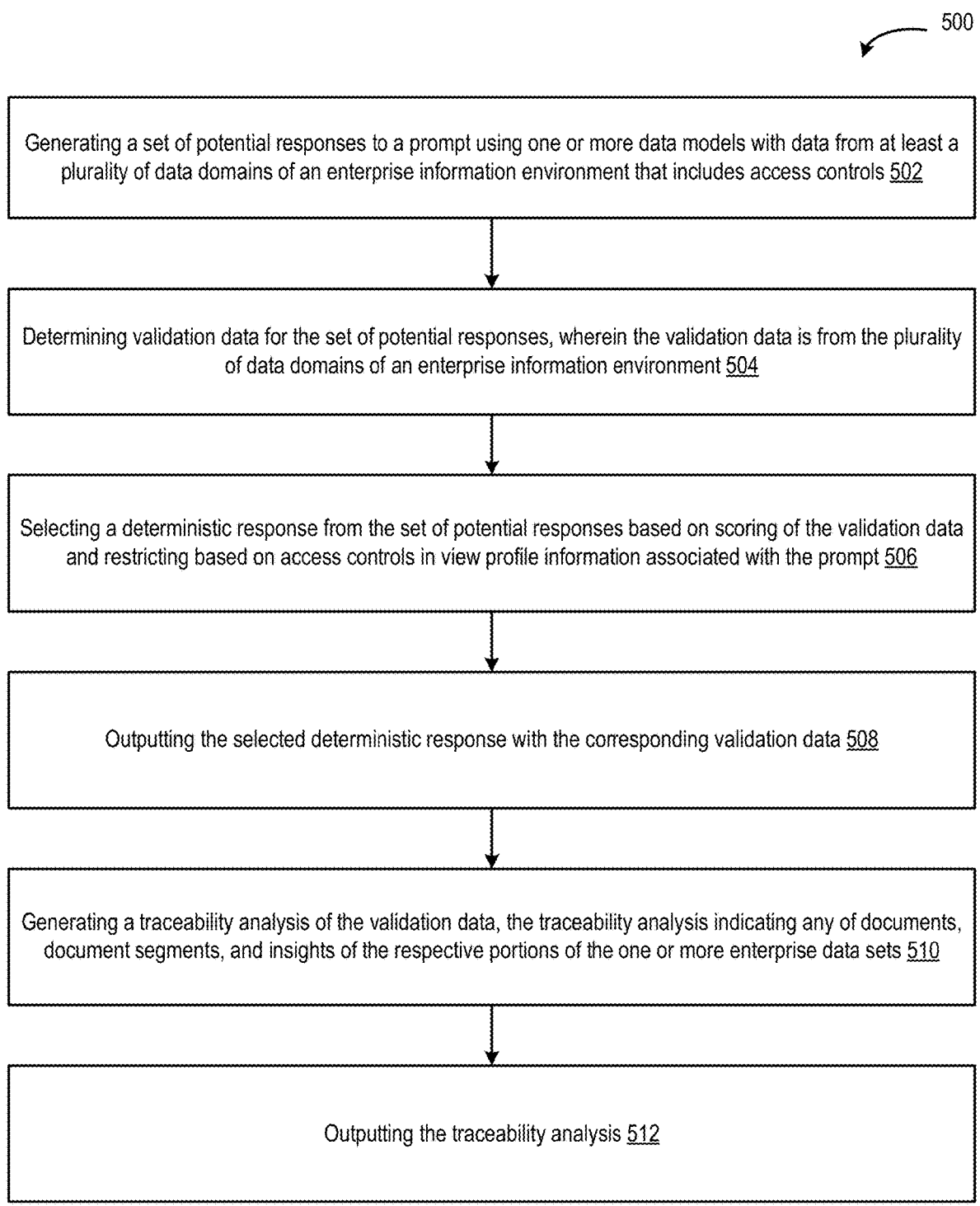
FIG. 5 depicts a flowchart of an example enterprise generative artificial intelligence method according to some embodiments.

FIG. 5 depicts a flowchart 500 of an example enterprise generative artificial intelligence method according to some embodiments. In step 502, an enterprise generative artificial intelligence system (e.g., enterprise generative artificial intelligence system 400) generates a set of potential responses to a prompt using one or more data models (e.g., one or more large language models) with data from at least a plurality of data domains of an enterprise information environment that includes access controls. For example, the set of potential responses includes responses that are generated based on different data and/or access controls. For example, one of the potential responses may correspond to (e.g., be generated for) a director with access to the entire enterprise information environment (e.g., all of the data domains), and another potential response may correspond to (e.g., be generated for) an engineer with limited access to the enterprise information environment (e.g., only one of the data domains). In some embodiments, an enterprise comprehension module (e.g., enterprise comprehension module 412) generates the potential responses.

In some embodiments, the one or more data models include multiple models trained for different data domains of the plurality of data domains. Each data model may represent respective relationships and attributes of the corresponding different data domain of the plurality of different data domains. The respective relationships and attributes may include data types, data formats, and/or industry-specific information. The one or more data models may include one or more large language models. In some embodiments, the selected deterministic response includes predictions, insights, and/or recommendations from one or more artificial intelligence applications.

In some embodiments, the access controls enforce restrictions including at least one of administrative policies, security policies, profile rights, and organizational controls. The access controls may cause a different deterministic response to be selected based on profiles with different access rights. The access controls may cause different validation data to be output based on profiles with different access rights. In some embodiments, an access control layer (e.g., enterprise access control layer 115) and/or enterprise access module (e.g., enterprise access control module 416) enforce the restrictions, and the different deterministic response may be selected by the enterprise comprehension module in view of the restrictions. In another example, the enterprise access control module may select the different deterministic responses from the potential responses generated by the enterprise comprehension module. For example, the enterprise access control module may filter or select the deterministic response based on the restrictions.

In step 504, the enterprise generative artificial intelligence system determines validation data for the set of potential responses. The validation data is from the plurality of data domains of an enterprise information environment.

In step 506, the enterprise generative artificial intelligence system selects a deterministic response from the set of potential responses based on scoring of the validation data and restricting based on the access controls in view of profile information associated with the prompt. In some embodiments, the enterprise comprehension module selects the deterministic response based on instructions from the enterprise access control module. In another example, the enterprise access control module selects the deterministic response from the potential responses generated by the enterprise comprehension module.

In some embodiments, the scoring of the validation may include determining, based on the one or more data models, a plurality of relevance scores associated with at least a portion of each piece of validation data for the set of potential responses. A retrieval module (e.g., retrieval module 406) may perform determining the relevance scores.

In step 508, the enterprise generative artificial intelligence system outputs the selected deterministic response with the corresponding validation data. In some embodiments, the output includes data visualization, automated control and instruction, a report, and a dynamically configured dashboard. In some embodiments, the enterprise comprehension module and/or a presentation module (e.g., presentation module 430) outputs the selected deterministic response with the corresponding validation data.

The outputs can include predictions, insights, or recommendations from the associated AI applications and be in the form of dispatching actions, decision support guidance, inter-platform instruction generation, a dynamic dashboard, automated summary charts of critical information, AI-generated summary answers with references to sources, email briefs, alerts, generic content generation (e.g., proposals), an AI-powered chat interface, ranked list of top results, etc. from the one or more AI applications, open source libraries, document libraries, email systems, etc.

In step 510, the enterprise generative artificial intelligence system generates a traceability analysis of the validation data, the traceability analysis indicating one or more documents, document segments, and/or insights of the respective portions of the one or more enterprise data sets. In some embodiments, an artificial intelligence traceability module (e.g., artificial intelligence traceability module 418) generates the traceability analysis.

In step 512, the enterprise generative artificial intelligence system outputs the traceability analysis. In some embodiments, the artificial intelligence traceability module and/or the presentation module outputs the traceability analysis.

Figure 6:
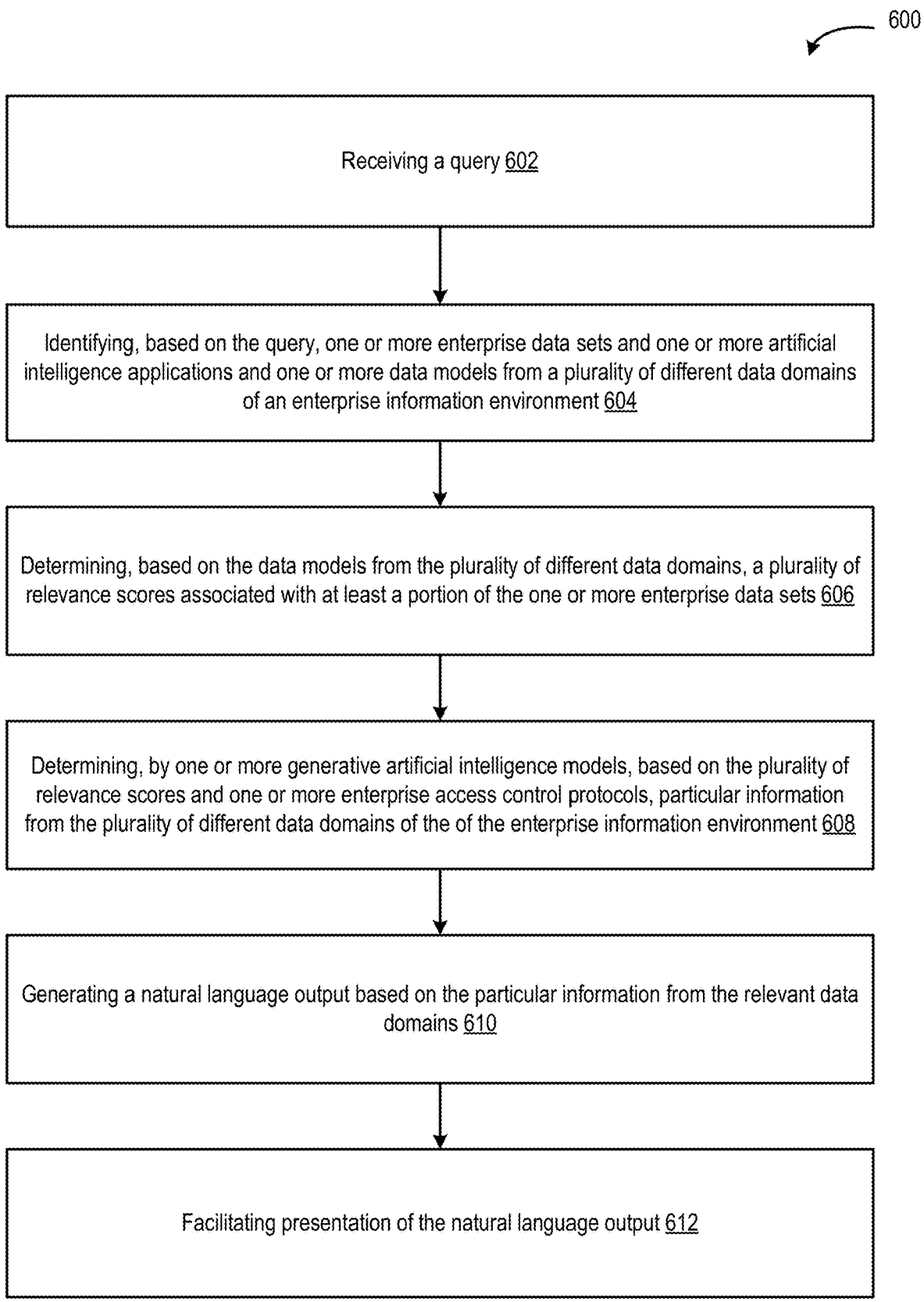
FIG. 6 depicts a flowchart of an example enterprise generative artificial intelligence method according to some embodiments.

FIG. 6 depicts a flowchart 600 of an example enterprise generative artificial intelligence method according to some embodiments. In step 602, an enterprise generative artificial intelligence system (e.g., enterprise generative artificial intelligence system 400) receives a query (e.g., from a user or other system). For example, the query may be a natural language query received through a graphical user interface. In some embodiments, an orchestrator module (e.g., orchestrator module 404) receives the query.

In step 604, the enterprise generative artificial intelligence system identifies, based on the query, one or more enterprise data sets, one or more artificial intelligence applications, and one or more data models from a plurality of different data domains of an enterprise information environment. In some embodiments, the orchestrator module identifies the enterprise data sets and/or artificial intelligence applications.

In step 606, the enterprise generative artificial intelligence system determines, based on the data models from the plurality of different data domains, a plurality of relevance scores associated with at least a portion of the one or more enterprise data sets. In some embodiments, a retrieval module (e.g., retrieval module 406) determines the relevance scores (e.g., using a similarity machine learning model implementing a similarity algorithm).

In step 608, the enterprise generative artificial intelligence system determines, by one or more generative artificial intelligence models, based on the plurality of relevance scores and one or more enterprise access control protocols, particular information from the plurality of different data domains of the enterprise information environment. In one example, the enterprise comprehension module determines the particular information.

In step 610, the enterprise generative artificial intelligence system generates a natural language output based on the particular information from the relevant data domains. In some embodiments, the enterprise comprehension module generates the natural language output.

In step 612, the enterprise generative artificial intelligence system facilitates presentation of the natural language output. A presentation module (e.g., presentation module 430) may facilitate the presentation (e.g., at least partially cause the natural language output to be presented through a graphical user interface of another system).

In step 614, the enterprise generative artificial intelligence system generates a traceability analysis of the natural language output. The traceability analysis can indicate the documents, the document segments, and/or the insights of the respective portions of the one or more enterprise data sets. In some embodiments, an artificial intelligence traceability module (e.g., artificial intelligence traceability module 418) generates the traceability analysis.

In step 616, the enterprise generative artificial intelligence system facilitates a presentation of the traceability analysis. In some embodiments, the presentation module facilitates the presentation of the traceability analysis.

Figure 7A:
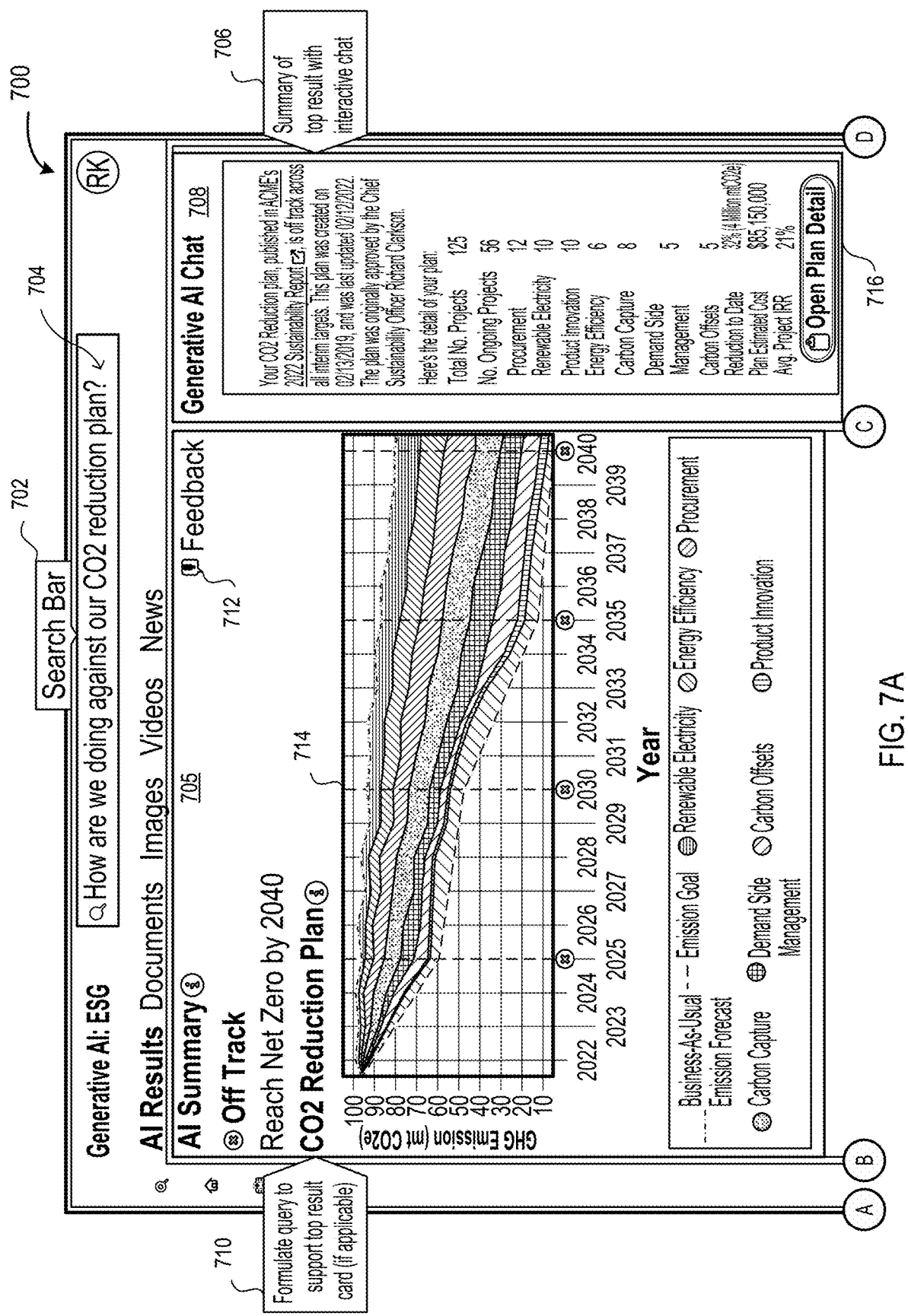

FIG. 7A and FIG. 7B depict a diagram of an example enterprise generative artificial intelligence response graphical user interface 700 according to some embodiments. In some embodiments, the enterprise generative artificial intelligence response graphical user interface 700 can be generated at least in part by the enterprise generative artificial intelligence systems described herein. In the example of FIG. 7A and FIG. 7B, the enterprise generative artificial intelligence response graphical user interface 700 includes an enterprise search query input portion 702, a generative enterprise search result portion 705, and an interactive query portion 708.

The enterprise search query input portion 702 presents an enterprise search query 704. In some implementations, the query can be input through the input portion 702, although it may also have been input in another interface (e.g., interface 200 shown in FIG. 2A) and presented in the input portion 702 as part of the generative enterprise search response.

The generative enterprise search result portion 705 indicates a type of generative artificial intelligence response (e.g., AI summary), a plan performance target (e.g., off track), the plan (e.g., $CO_2$ reduction plan), performance analytics, and other information. The generative enterprise search result portion 705 includes interactive icons, such as the feedback graphical icon 712. The feedback graphical icon 712 can enable users to provide feedback regarding the response (e.g., positive or negative feedback). Enterprise generative artificial intelligence systems can, for example, use the received feedback to improve the enterprise generative artificial intelligence systems (e.g., through reinforcement learning). The enterprise search result portion 705 also includes visualization 714 which can include visualization of predictive analytics associated with the plan and/or plan performance targets. Visualization can be three dimensional (3D) and include interactive elements related to the deterministic output, for example, that enable executing instructions (e.g., transmissions, control system commands, etc.), drilling into traceability, activating application features, and the like.

In the example of FIG. 7A and FIG. 7B, the interactive query portion 708 is in a generative artificial intelligence chat interface which provides a summary of top results with the interactive chat 706. Users can trigger presentation of plan details via interactive graphical icon 716. Queries can be formulated to support a top result card in some embodiments by interacting with the portion 710 (e.g., $CO_2$ Reduction Plan icon) of the enterprise search result portion 705. The result portion 705 also includes a ranked list of results 718, and users can provide follow-up questions in an interactive input portion 722 of the interactive query portion 708, and regenerate answers with the regenerate answer interactive graphical icon 720. The interactive query portion 708 can enable users to input additional related queries (e.g., "follow-up" questions) through the interactive input portion 722. In the example of FIG. 7A and FIG. 7B, the interactive query portion 708 comprises a chat interface, although other interfaces may use different interactive query portions.

Figure 8:
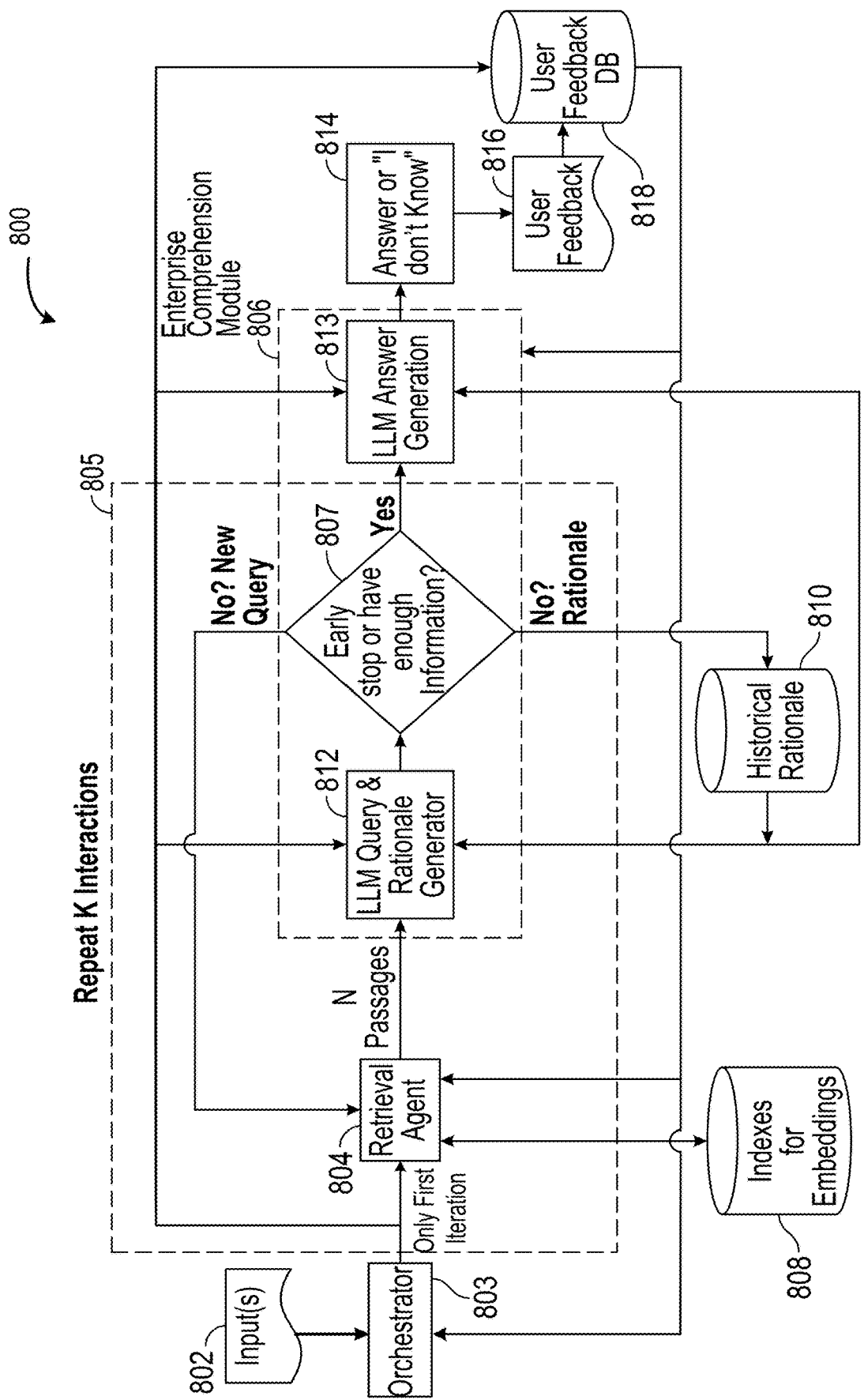
FIG. 8 depicts a diagram of an example system architecture and flow for an iterative enterprise generative artificial intelligence process according to some embodiments.

FIG. 8 depicts a diagram 800 of an example architecture of an enterprise generative artificial intelligence system (e.g., enterprise generative artificial intelligence system 102, 302, and/or 400) implementing an iterative enterprise search process according to some embodiments.

Enterprise generative artificial intelligence systems can, among other things, provide results that are more accurate and less biased than current generative artificial intelligence solutions, and can effectively leverage information and machine learning-based insights (or, simply, insights) across different domains. More specifically, enterprise generative artificial intelligence systems can, in some embodiments, use context-based iterations that allow models (e.g., machine learning models, large language models) to effectively learn from each other based on context generated during an iterative process. Accordingly, in some embodiments, enterprise generative artificial intelligence systems do not simply rely on generic probability distributions and single-pass solutions (e.g., traditional large language model-based systems) and can respond more intelligently with improved validation to inputs than existing generative artificial intelligence solutions.

Moreover, enterprise generative artificial intelligence systems can also effectively handle complex inputs (e.g., instruction sets, queries, natural language inputs or other human-readable inputs, machine-readable inputs) from users, software (e.g., artificial intelligence applications), and machines. For example, enterprise generative artificial intelligence systems do not rely on a single pass to return a result, but rather can iteratively communicate between different models and different types of models until an acceptable result (e.g., "answer") is generated, which is particularly useful for complex inputs. The enterprise generative artificial intelligence systems disclosed herein can enhance the quality of output, improve likelihood of relevance, reduce the likelihood of presenting faulty and biased information, and prevent other potential technical issues. For example, supervisory functions (e.g., stopping conditions) can prevent infinite loops and other technical problems.

An example system flow of an enterprise generative artificial intelligence system implementing an iterative context-based generative artificial intelligence process is shown in FIG. 8. In the example of FIG. 8, the enterprise generative artificial intelligence system includes one or more retrieval modules 804 and one or more enterprise comprehension modules 806. For example, the retrieval module 804 can include one or more neural network transformer-based machine learning models, and the enterprise comprehension module 806 can include one or more large language models. These modules, and the iterative interactions (e.g., communication) between these modules, can allow enterprise generative artificial intelligence systems to achieve the technical features and technical benefits discussed herein.

In the example of FIG. 8, an enterprise generative artificial intelligence system can receive an initial input 802 from a user or another system. For example, an orchestrator module 803 may receive the input 802. The enterprise generative artificial intelligence system can provide that input to a retrieval module 804 which can then reach out and "retrieve" information from various enterprise data sources (e.g., data stores, databases, artificial intelligence applications, and/or the like). The enterprise generative artificial intelligence system can use that information to generate an initial prompt for the enterprise comprehension module 806. The enterprise comprehension module 806 can process that initial prompt and determine whether it has enough information to satisfy criteria based on the initial input (e.g., answer a question). If it has enough information to satisfy the initial input, the enterprise comprehension module can then provide the result to a recipient, such as the user or system that provided the initial input. However, if the enterprise comprehension module 806 determines that it does not have enough information to satisfy criteria based on the initial input, it can further synthesize information via the iterative process which provides the core benefit of the system.

There could be many reasons that the enterprise comprehension module 806 may need additional information. For example, traditional systems only use a single pass process which only addresses a portion of a complex input. The enterprise generative artificial intelligence system addresses this problem by triggering subsequent iterations to solve the remaining portions of the complex input, as well as including context to further refine the process.

More specifically, if the enterprise comprehension module 806 determines that it needs additional information to satisfy the initial input, it can generate context-specific data (or, simply, "context") that will inform future iterations of the process and help the system more efficiently and accurately satisfy the initial input. The context is based on the rationale used by the enterprise comprehension module 806 when it is processing queries (or other inputs). For example, the enterprise comprehension module 806 may receive segments of information retrieved by the retrieval module 804. The segments may be passages of data record(s), for example, and the segments may be associated with embeddings from an embeddings datastore 808 that facilitates processing by the enterprise comprehension module 806. A query and rationale generator 812 of the enterprise comprehension module 806 can process the information and generate a rationale for why it produced the result that it did. That rationale can be stored by the enterprise generative artificial intelligence system in an historical rationale datastore 810 and provide the foundation for the context of subsequent iterations.

Subsequent iterations can include the enterprise comprehension module 806 generating a new query, request, or other output that is then passed back to the retrieval module 804. The retrieval module 804 can process that new query and retrieve additional information. The system then generates a new prompt based on the additional information and the context. The enterprise comprehension module 806 can process the new prompt and again determines if it needs additional information. If it needs additional information (e.g., as shown in step 807), the enterprise generative artificial intelligence system can repeat (e.g., iterate) this process until the enterprise comprehension module 806 can satisfy criteria based on the initial input (e.g., query), at which point the enterprise comprehension module 806 can generate (step 813) the output result 814 (e.g., "answer" or "I don't know"). For example, generating the answer "I don't know" if no relevant passages have been generated (e.g., by applying a rule) and/or not enough relevant passages have been generated, the enterprise comprehension module 806 can prevent hallucination and increase the performance on the "I don't know" questions while saving a call to the models (e.g., large language models).

In some embodiments, whether there is enough information may be determined and/or correlated based on the number of passages that are retrieved but from which no relevant information was extracted (e.g., by the enterprise comprehension module 806 and/or extractor module 420). For example, a threshold number or percentage of the retrieved passages that had relevant information extracted may need to be satisfied (e.g., a particular number or percentage of the retrieved passages) for the enterprise comprehension module 806 to determine that it has enough information to answer the query. In another example, a threshold number or percentage of the retrieved passages that had no relevant information extracted (e.g., 4 passages or 80% of the retrieved passages) may cause the enterprise comprehension module 806 to determine that it does not have enough information to answer the query.

The enterprise generative artificial intelligence system may also implement supervisory functions, such as a stopping condition which prevents the system from hallucinating or otherwise providing an erroneous answer. The stopping condition can also prevent the system from executing an infinite iteration loop. In one example, the enterprise generative artificial intelligence system can limit the number of iterations that can be performed before the enterprise comprehension module 806 will either provide an output result or indicate that an output result cannot be found. The user may also provide feedback 816 which can be stored in a feedback datastore 818. The enterprise generative artificial intelligence system can, in some embodiments, use the feedback to improve the accuracy and/or reliability of the system.

Figure 9:
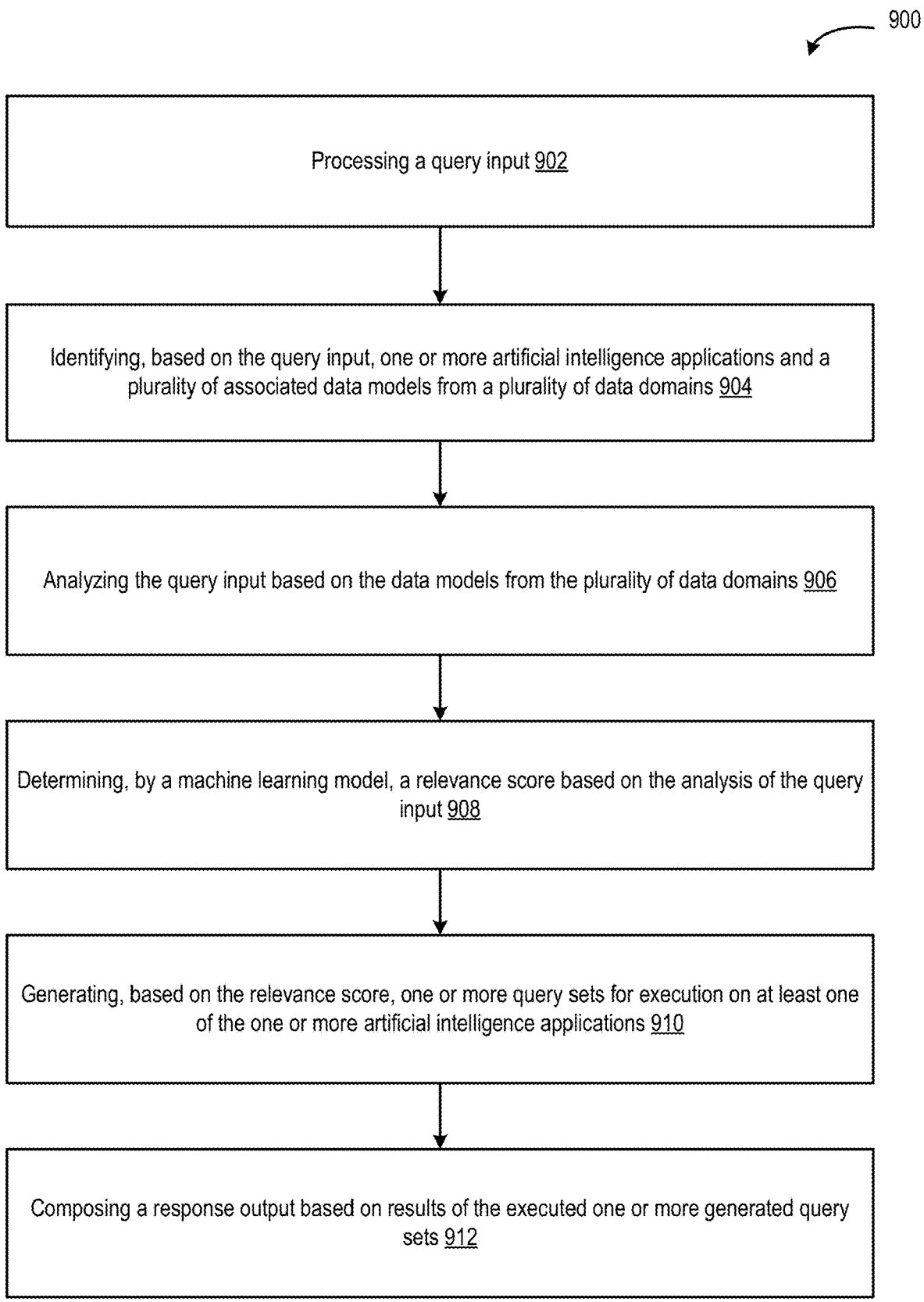
FIG. 9 depicts a flowchart of an example enterprise generative artificial intelligence method according to some embodiments.

FIG. 9 depicts a flowchart 900 of an example enterprise generative artificial intelligence method according to some embodiments. In step 902, an enterprise generative artificial intelligence system (e.g., enterprise generative artificial intelligence system 400) processes a query input. Processing the query input can include data modeling feature inspection and/or machine learning model simulations to select one or more analysis channels. In some embodiments, an orchestrator module (e.g., orchestrator module 404) processes the query input.

In step 904, the enterprise generative artificial intelligence system identifies, based on the query input, one or more artificial intelligence applications and a plurality of associated data models from a plurality of data domains. In some embodiments, the orchestrator module identifies the artificial intelligence applications and the data models.

In step 906, the enterprise generative artificial intelligence system analyzes the query input based on the data models from the plurality of data domains. In some embodiments, the orchestrator module analyzes the query input.

In step 908, the enterprise generative artificial intelligence system determines, by a machine learning model, a relevance score based on the analysis of the query input. In some embodiments, a retrieval module (e.g., retrieval module 406) determines the relevance score.

In step 910, the enterprise generative artificial intelligence system generates, based on the relevance score, one or more query sets for execution on at least one of the one or more artificial intelligence applications. The query sets may be configured to address a range of different artificial intelligence applications and data sets. The one or more query sets configured for the range of different artificial intelligence applications and data sets are based on a type system to define types for use by the different artificial intelligence applications. In some embodiments, the retriever module generates the one or more query sets.

In step 912, the enterprise generative artificial intelligence system composes a response output based on results of the executed one or more generated query sets. The response output can include a report or dynamically configured dashboards based on any of the predictions, insights, and/or recommendations from the associated artificial intelligence applications. The response output may include a report or dynamically configured dashboards based on the predictions, insights, and/or recommendations from the associated artificial intelligence applications. The results of one or more generated query sets (e.g., execution of those query sets) can relate to multiple different artificial intelligence applications, and the results can include newly generated insights from the multiple different artificial intelligence applications. In some embodiments, an enterprise comprehension module (e.g., enterprise comprehension module 412) composes the response.

Figure 10:
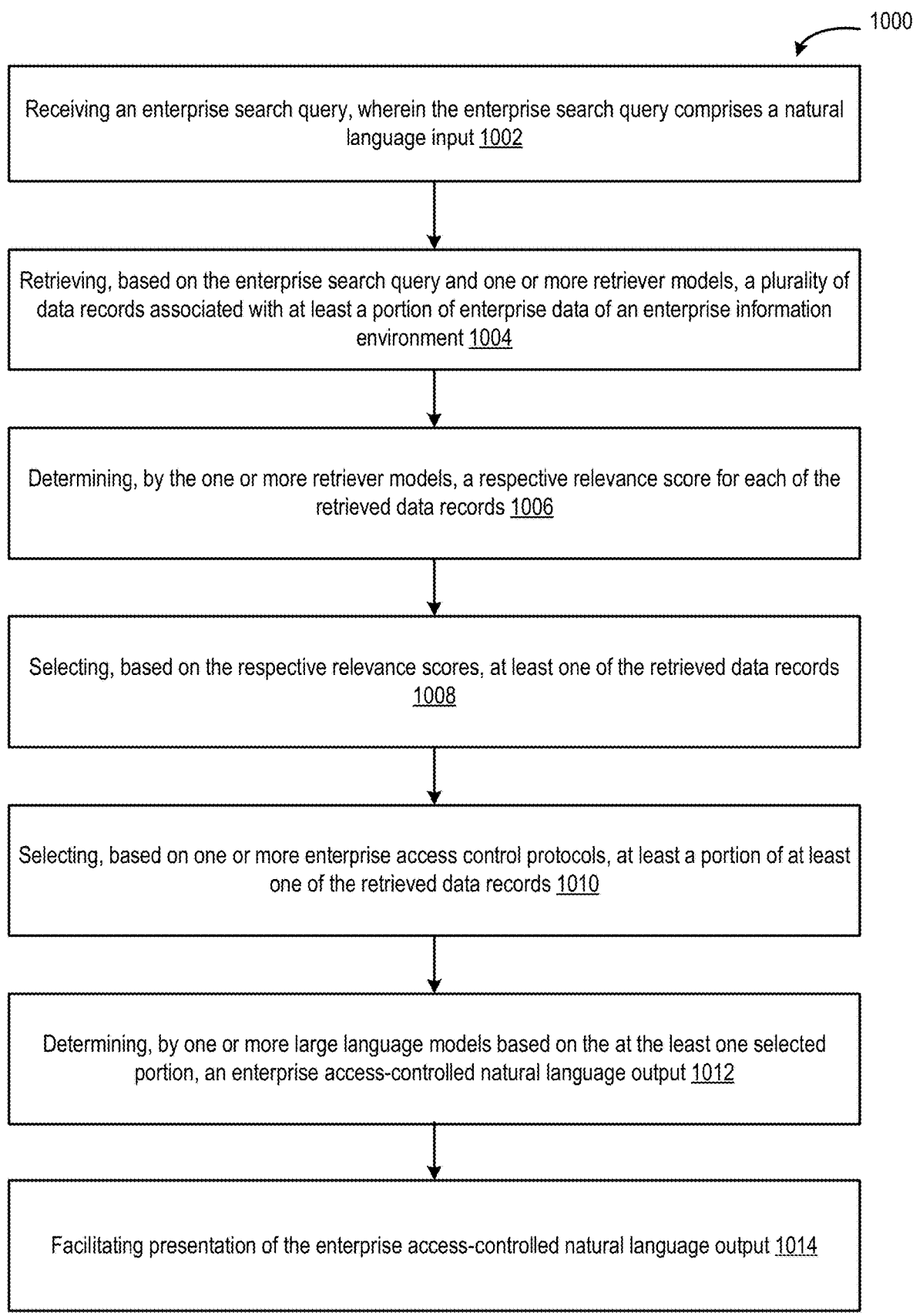
FIG. 10 depicts a flowchart of an example enterprise generative artificial intelligence method according to some embodiments.

FIG. 10 depicts a flowchart 1000 of an example enterprise generative artificial intelligence method according to some embodiments. In step 1002, an enterprise generative artificial intelligence system (e.g., enterprise generative artificial intelligence system 400) receives an enterprise search query. The enterprise search query may be a natural language input. In some embodiments, an orchestrator module (e.g., orchestrator module 404) receives the query.

In step 1004, the enterprise generative artificial intelligence system retrieves, based on the enterprise search query and one or more retriever models, a plurality of data records associated with at least a portion of enterprise data of an enterprise information environment. In some embodiments, a retrieval module (e.g., retrieval module 406) retrieves data records.

In step 1006, the enterprise generative artificial intelligence system determines, by the one or more retriever models, a respective relevance score for each of the retrieved data records. In some embodiments, the retrieval model determines the relevance scores.

In step 1008, the enterprise generative artificial intelligence system selects, based on the respective relevance scores, at least one of the retrieved data records. In one example, the retrieval model selects the retrieved documents. In another example, an enterprise comprehension module (e.g., enterprise comprehension module 412) selects the documents.

In step 1010, the enterprise generative artificial intelligence system selects, based on one or more enterprise access control protocols, at least a portion of at least one of the retrieved data records. The retriever module, enterprise comprehension module, and/or an enterprise access control module (e.g., enterprise access control module 416) selects the portions of the retrieved data records.

In step 1012, the enterprise generative artificial intelligence system determines, by one or more large language models based on the at least one selected portion, an enterprise access-controlled natural language output. In some embodiments, the enterprise comprehension module determines the enterprise access-controlled natural language output.

In step 1014, the enterprise generative artificial intelligence system facilitates presentation of the enterprise access-controlled natural language output. In some embodiments, a presentation module (e.g., presentation module 430) facilitates presentation of the enterprise access-controlled natural language output.

Figure 11:
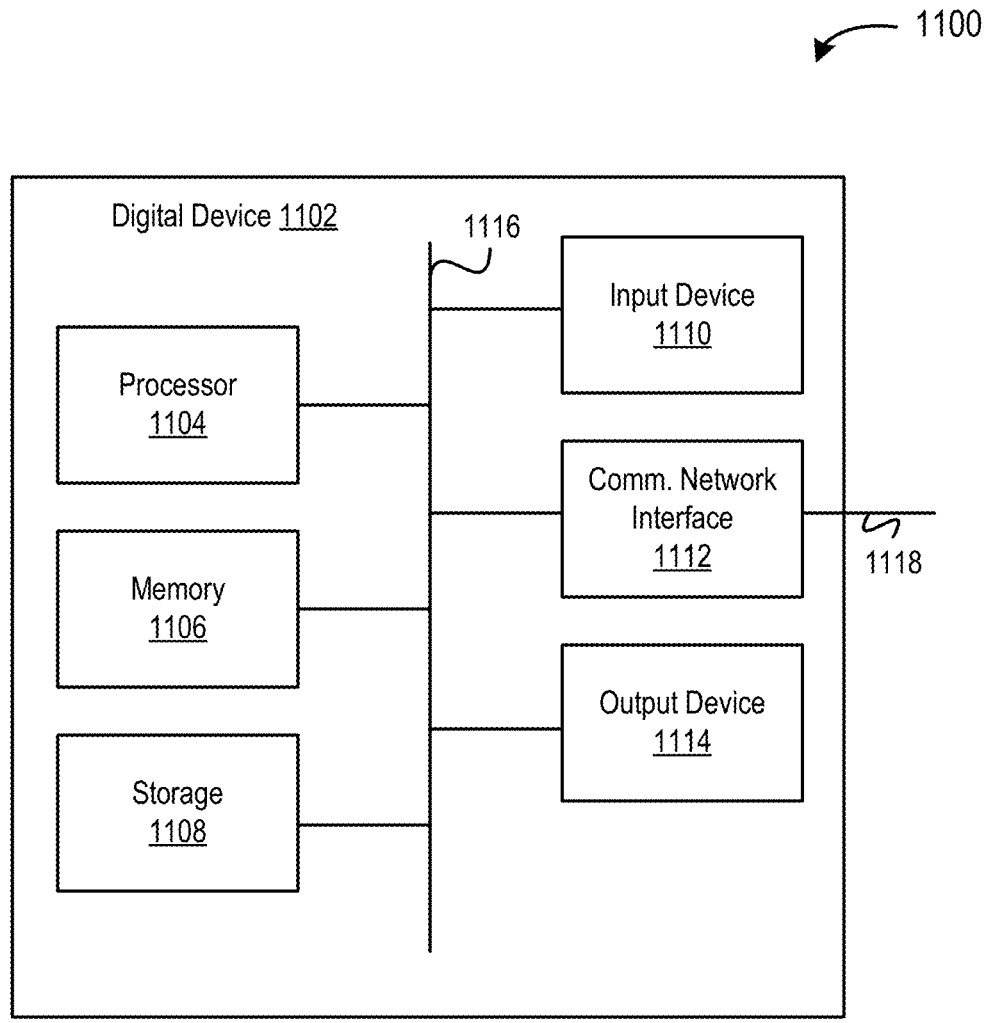
FIG. 11 is a diagram of an example computer system for implementing the features disclosed herein according to some embodiments.

FIG. 11 depicts a diagram 1100 of an example of a computing device 1102. Any of the systems, modules, layers, engines, datastores, and/or networks described herein may comprise an instance of one or more computing devices 1102. In some embodiments, functionality of the computing device 1102 is improved to perform some or all of the functionality described herein. The computing device 1102 comprises a processor 1104, memory 1106, storage 1108, an input device 1110, a communication network interface 1112, and an output device 1114 communicatively coupled to a communication channel 1116. The processor 1104 is configured to execute executable instructions (e.g., programs).

In some embodiments, the processor 1104 comprises circuitry or any processor capable of processing the executable instructions.

The memory 1106 stores data. Some examples of memory 1106 include storage devices, such as RAM, ROM, RAM cache, virtual memory, etc. In various embodiments, working data is stored within the memory 1106. The data within the memory 1106 may be cleared or ultimately transferred to the storage 1108.

The storage 1108 includes any storage configured to retrieve and store data. Some examples of the storage 1108 include flash drives, hard drives, optical drives, cloud storage, and/or magnetic tape. Each of the memory system 1106 and the storage system 1108 comprises a computer-readable medium, which stores instructions or programs executable by processor 1104.

The input device 1110 is any device that inputs data (e.g., mouse and keyboard). The output device 1114 outputs data (e.g., a speaker or display). It will be appreciated that the storage 1108, input device 1110, and output device 1114 may be optional. For example, the routers/switchers may comprise the processor 1104 and memory 1106 as well as a device to receive and output data (e.g., the communication network interface 1112 and/or the output device 1114).

The communication network interface 1112 may be coupled to a network (e.g., network 308) via the link 1118. The communication network interface 1112 may support communication over an Ethernet connection, a serial connection, a parallel connection, and/or an ATA connection. The communication network interface 1112 may also support wireless communication (e.g., 802.11 a/b/g/n, WiMax, LTE, Wi-Fi). It will be apparent that the communication network interface 1112 may support many wired and wireless standards.

It will be appreciated that the hardware elements of the computing device 1102 are not limited to those depicted in FIG. 11. A computing device 1102 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1104 and/or a co-processor located on a GPU (e.g., NVidia).

Example types of computing devices and/or processing devices include one or more microprocessors, microcontrollers, reduced instruction set computers (RISCs), complex instruction set computers (CISCs), graphics processing units (GPUs), data processing units (DPUs), virtual processing units, associative process units (APUs), tensor processing units (TPUs), vision processing units (VPUs), neuromorphic chips, AI chips, quantum processing units (QPUs), cerebras wafer-scale engines (WSEs), digital signal processors (DSPs), application specific integrated circuits (ASICs), field programmable gate arrays (FPGAs), or discrete circuitry.

It will be appreciated that a "module," "layer," "engine," "system," "datastore," and/or "database" may comprise software, hardware, firmware, and/or circuitry. In one example, one or more software programs comprising instructions capable of being executable by a processor may perform one or more of the functions of the modules, layers, engines, datastores, databases, or systems described herein. In another example, circuitry may perform the same or similar functions. Alternative embodiments may comprise more, less, or functionally equivalent modules, layers, systems, datastores, or databases, and still be within the scope of present embodiments. For example, the functionality of the various systems, modules, layers, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise. A claimed solution rooted in computer technology overcomes problems specifically arising in the realm of computer technology.

Large language models are trained with large amounts of data that make up the model's inherent knowledge. Large language models typically utilize the inherent knowledge with a vector store to generate a string of words that conform to vocabulary and grammar rules but have no accuracy or validity. Hallucination in artificial intelligence refers to a response generated by an AI which contains non-responsive, false or misleading information. AI hallucination is associated with the category of unjustified responses or beliefs.

Enterprise AI Search exposes LLMs to a corpus of data to generate responses rooted in documentation or data. LLM generated responses can be reviewed in light of the corpus of documentation or data to identify citable references that substantiate the response as anti-hallucination. In some embodiments, the generative artificial intelligence models are separated from the enterprise data of the enterprise information environment, and the separation includes the generative artificial intelligence models not being trained on the enterprise data of the enterprise information environment. In some embodiments, the natural language output comprises a deterministic response caused at least in part by the separation of the generative artificial intelligence models from the enterprise data of the enterprise information environment. In some embodiments, the separation of the generative artificial intelligence models from the enterprise data of the enterprise information environment reduces hallucination and information leakage of the generative artificial intelligence models relative to other generative artificial intelligence models that have been trained on other enterprise data of other enterprise information environments.

In the flowcharts and/or sequence diagrams, the flowcharts illustrate by way of example a sequence of steps. It should be understood that some or all of the steps may be repeated, reorganized for parallel execution, and/or reordered, as applicable. Moreover, some steps that could have been included may have been removed to avoid providing too much information for the sake of clarity and some steps that were included could be removed but may have been included for the sake of illustrative clarity.

Various embodiments of the present disclosure include systems, methods, and non-transitory computer-readable media configured to generate a set of potential responses to a prompt using one or more data models with data from at least a plurality of data domains of an enterprise information environment that includes access controls. Validation data is determined for the set of potential responses, wherein the validation data is from the plurality of data domains of an enterprise information environment. A deterministic response is selected from the set of potential responses based on scoring of the validation data and restricting based on access controls in view of profile information associated with the prompt. The selected deterministic response is output with the corresponding validation data.

In some embodiments, a system comprises one or more processors, and memory storing instructions that, when executed by the one or more processors, cause the system to perform the functionality described herein. The systems, methods, and non-transitory computer readable media are further configured to generate a traceability analysis of the validation data, the traceability analysis indicating any of documents, document segments, and insights of the respective portions of the one or more enterprise data sets. The systems, methods, and non-transitory computer readable media are further configured to determine, based on the one or more data models, a plurality of relevance scores associated with at least a portion of each piece of validation data for the set of potential responses. The one or more data models comprises multiple models trained for different data domains of the plurality of data domains, wherein each data model represents respective relationships and attributes of the corresponding different data domain of the plurality of different data domains, and the respective relationships and attributes include any of data types, data formats, and industry-specific information.

In some embodiments, the data model is a large language model. In some embodiments, the access controls enforce restrictions including at least one of administrative policies, security policies, profile rights, and organizational controls. In some embodiments, the access controls cause a different deterministic response to be selected based on profiles with different access rights. In some embodiments, the access controls cause a different validation data to be output based on profiles with different access rights. In some embodiments, the selected deterministic response comprises at least one of predictions, insights, or recommendations from an artificial intelligence application. In some embodiments, the output includes at least one of data visualization, automated control and instruction, a report, and a dynamically configured dashboard.

Various embodiments of the present disclosure include systems, methods, and non-transitory computer-readable media configured to receive a query. One or more enterprise data sets, one or more artificial intelligence applications, and one or more data models from a plurality of different data domains of an enterprise information environment are identified based on the query. A plurality of relevance scores associated with at least a portion of the one or more enterprise data sets are determined based on the data models from the plurality of different data domains. Particular information from the plurality of different data domains of the enterprise information environment is determined by one or more generative artificial intelligence models, based on the plurality of relevance scores and one or more enterprise access control protocols. A natural language output is generated based on the particular information from the relevant data domains, and a presentation of the natural language output is facilitated.

In some embodiments, a system comprises one or more processors, and memory storing instructions that, when executed by the one or more processors, cause the system to perform the functionality described herein. In some embodiments, the query comprises a natural language query received through a graphical user interface. In some embodiments, the one or more enterprise data sets include any of documents, document segments, and insights generated by the one or more artificial intelligence applications. In some embodiments, each of the relevance scores is associated with a respective portion of the one or more enterprise data sets, and each of the relevance scores is determined relative to the other respective portions of the one or more enterprise data sets. In some embodiments, the systems, methods, and non-transitory computer readable media are further configured to perform generating a traceability analysis of the natural language output, the traceability analysis indicating any of the documents, the document segments, and the insights of the respective portions of the one or more enterprise data sets.

In some embodiments, each data model of the plurality of data models corresponds to a different data domain of the plurality of different data domains. In some embodiments, each data model represents respective relationships and attributes of the corresponding different data domain of the plurality of different data domains. In some embodiments, the respective relationships and attributes include any of data types, data formats, and industry-specific information. In some embodiments, the natural language output comprises a summary of at least one of the respective portions of the one or more enterprise data sets associated with a relevance score.

In some embodiments, the systems, methods, and non-transitory computer readable media are further configured to embed respective objects in the plurality of the different data domains of the enterprise information environment. The respective objects can enable the one or more enterprise access control protocols. In some embodiments, the enterprise access control protocols include user role-based enterprise access control protocols. In some embodiments, the enterprise access control protocols cause a first user with a first user role to be presented with a different natural language output relative to a second user with a second user role. In some embodiments, the enterprise access control protocols enable and/or cause preventing the presentation of at least a portion of the natural language output. In some embodiments, enterprise access control protocols prevent at least of a portion of the particular information from the relevant data domains from being used to generate the natural language output; and prevent, prior to the identification, access to any of particular enterprise data sets, particular artificial intelligence applications, particular data models, and particular data domains of the enterprise information environment.

Various embodiments of the present disclosure include systems, methods, and non-transitory computer-readable media configured to process a query input. One or more artificial intelligence applications and a plurality of associated data models from a plurality of data domains are identified based on the query input. The query input is analyzed based on the data models from the plurality of data domains. A relevance score is determined by a machine learning model based on the analysis of the query input. One or more query sets for execution on at least one of the one or more artificial intelligence applications are generated based on the relevance score. A response output is composed based on results of the executed one or more generated query sets.

In some embodiments, a system comprises one or more processors, and memory storing instructions that, when executed by the one or more processors, cause the system to perform the functionality described herein. In some embodiments, processing the query input comprises any of data modeling feature inspection and machine learning model simulations to select one or more analysis channels. In some embodiments, the response output comprises any of predictions, insights, or recommendations from the associated artificial intelligence applications. In some embodiments, the response output comprises any of a report or dynamically configured dashboards based on any of the predictions, insights, or recommendations from the associated artificial intelligence applications. In some embodiments, the one or more query sets generated to run on the associated artificial intelligence applications are configured to address a range of different artificial intelligence applications and data sets. In some embodiments, the one or more query sets configured for the range of different artificial intelligence applications and data sets are based on a type system to define types for use by the different artificial intelligence applications.

In some embodiments, the results of one or more generated query sets relate to multiple different artificial intelligence applications, and the results can include newly generated insights from the multiple different artificial intelligence applications. In some embodiments, processing query input comprises natural language processing with vectorized data and can generate pre-trained transformers that are fine-tuned or re-trained on specific data tailored to the type of query for an associated artificial intelligence application.

Various embodiments of the present disclosure include systems, methods, and non-transitory computer-readable media configured to receive an enterprise search query, wherein the enterprise search query comprises a natural language input. Based on the enterprise search query and one or more retriever models, a plurality of data records associated with at least a portion of enterprise data of an enterprise information environment are retrieved. A respective relevance score is determined by the one or more retriever models, for each of the retrieved data records. At least one of the retrieved data records is selected based on the respective relevance scores. At least a portion of at least one of the retrieved data records is selected based on one or more enterprise access control protocols.

The systems, methods, modules, layers, engines, datastores, and/or databases described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

According to examples disclosed herein there is provided a computer implemented method comprising: generating a set of potential responses to a prompt using one or more data models with data from at least a plurality of data domains of an enterprise information environment that includes access controls; determining validation data for the set of potential responses, wherein the validation data is from the plurality of data domains of an enterprise information environment; selecting a deterministic response from the set of potential responses based on scoring of the validation data and restrictions based on access controls associated with the prompt; and outputting the selected deterministic response with the corresponding validation data.

The validation data may comprise or otherwise be indicative of data from the plurality of data domains on which the set of potential responses is based. For example, the validation data may comprise or otherwise be indicative of any of documents, document segments, and insights of the respective portions of the data domains on which the potential responses are based. For example, for each potential response, the validation data for that potential response may comprise or otherwise be indicative of data (e.g., any of documents, document segments, and insights of the respective portions of the one or more enterprise data sets) from the plurality of data domains on which that potential response is based.

The determining and outputting of the validation data with a deterministic response provides traceability and transparency as to the data on which a response to the prompt is provided, thereby improving the integrity of the response. For example, the validation data allows a response to be checked against the sources of information on which it is based. The validation data further allows transparency as to the operation of the one or more data models and allows insight into the internal functioning of the data models.

The access controls may comprise access controls included in view of profile information associated with the prompt. The access controls may comprise controls associated with credentials (e.g., user credentials and/or user profile) associated with an input of the prompt. For example, the prompt may be input at a computing device by a user who is logged into or otherwise accessing a system or device using credentials, such as user credentials (e.g., login credentials). The credentials used in inputting the prompt may have access controls associated with them. The access controls may comprise rights or permissions associated with the credentials and may be used to restrict access to data from the plurality of data domains. For example, the access controls may be used to determine data from the plurality of data domains to which access is granted and/or data from the plurality of data domains to which access should not be granted. The selecting a deterministic response from the set of potential responses based on scoring of the validation data and restrictions based on access controls may comprise not selecting a deterministic response from the set of potential responses which includes information which is restricted based on the access controls. For example, one or more of the set of potential responses may be based on data from the plurality of data domains which the access controls indicate should not be included in a response to the prompt (e.g., it may include information which is restricted for a user inputting the prompt). Access to such a potential response may be restricted and may not be provided as the selected deterministic response.

The selecting a deterministic response from the set of potential responses based on scoring of the validation data and restrictions based on access controls may comprise selecting a deterministic response from the set of potential responses which includes information which is not restricted based on the access controls. For example, one or more of the set of potential responses may be based on data from the plurality of data domains which the access controls indicate can be included in a response to the prompt (e.g., it does not include information which is restricted for a user inputting the prompt).

The validation data and the access controls may be used together to select the deterministic response from the set of potential responses. For example, the validation data may be used to determine the data (e.g., any of documents, document segments, and insights of the respective portions of the one or more enterprise data sets) from the plurality of data domains on which a potential response and the access controls may be used to determine whether access to a potential response based on that data is permitted or should be restricted.

The validation data and the access controls may therefore serve to provide a synergistic technical effect of improving the security and integrity of the enterprise information environment. This differs from other model based (e.g., generative artificial intelligence based) response systems which may suffer from information leakage as information and data are ingested into models and/or during the training of models with no or limited traceability or security controls.

The deterministic response may comprise a response which would be reproduced a plurality of times in response to the same prompt and access controls. This differs from other model based (e.g., generative artificial intelligence based) response systems which may generate different responses for different instances of providing the same prompt and subject to the same access controls. A deterministic response improves the integrity, reliability and traceability of a response provided in response to a prompt.

Outputting the selected deterministic response with the corresponding validation data may comprise displaying a representation of the selected deterministic response with the corresponding validation data on an electronic display. Outputting the selected deterministic response with the corresponding validation data may comprise transmitting the selected deterministic response with the corresponding validation data to a computing device for display at the computing device.

The selected deterministic response and the corresponding validation data which is output is dependent on the technical functioning of the one or more data models. The one or more data models may have been trained using a machine learning algorithm. The operation of the one or more data models in generating a set of potential responses may therefore be based on parameters which the one or more data models have learned through training (as opposed to parameters which have been set by a human programmer). The one or more data models may be implemented in dedicated hardware. Additionally, or alternatively, the one or more data models may comprise emulation of one or more data models in software.

The one or more data models may have been configured through training based on training data. The training data may be different from the data from the at least a plurality of data domains of the enterprise information environment. That is, the one or more data models may not have been trained on data stored in the enterprise information environment. This may prevent information leakage of data stored in the data domains of the enterprise information environment into outputs of the one or more data models, thereby improving the security and integrity of the data domains.

The method may further comprise generating a traceability analysis of the validation data, the traceability analysis indicating any of documents, document segments, and insights of the respective portions of the one or more enterprise data sets. The method may further comprise outputting the generating traceability analysis. For example, the generated traceability analysis may be transmitted to a computing device for display at the computing device. The scoring of the validation data may comprise determining, based on the one or more data models, a plurality of relevance scores associated with at least a portion of each piece of validation data for the set of potential responses.

The one or more data models may comprise multiple models trained for different data domains of the plurality of data domains, wherein each data model represents respective relationships and attributes of the corresponding different data domain of the plurality of different data domains, and wherein the respective relationships and attributes include any of data types, data formats, and industry-specific information.

The data model may be a large language model. The access controls may enforce restrictions including at least one of administrative policies, security policies, profile rights, and organizational controls. The access controls may cause a different deterministic response to be selected based on profiles with different access rights. The access controls may cause a different validation data to be output based on profiles with different access rights. The selected deterministic response may comprise at least one of predictions, insights, or recommendations from an artificial intelligence application. The output may include at least one of data visualization, automated control and instruction, a report, and a dynamically configured dashboard.

According to examples disclosed herein there is provided a computer implemented method comprising: receiving a query; identifying, based on the query, one or more enterprise data sets, one or more artificial intelligence applications, and one or more data models from a plurality of different data domains of an enterprise information environment; determining, based on the data models from the plurality of different data domains, a plurality of relevance scores associated with at least a portion of the one or more enterprise data sets; determining, by one or more generative artificial intelligence models, based on the plurality of relevance scores and one or more enterprise access control protocols, particular information from the plurality of different data domains of the enterprise information environment; generating a natural language output based on the particular information from the relevant data domains; and facilitating presentation of the natural language output.

Facilitating presentation of the natural language output may comprise generating a representation of the natural language output for display on an electronic display. Facilitating presentation of the natural language output may comprise displaying a representation of the natural language output on an electronic display. Facilitating presentation of the natural language output may comprise transmitting the natural language output to a computing device for display at the computing device.

The one or more enterprise access control protocols may comprise control protocols associated with credentials (e.g., user credentials and/or user profile) associated with an input of the query. For example, the query may be input at a computing device by a user who is logged into or otherwise accessing a system or device using credentials, such as user credentials (e.g., login credentials). The credentials used in inputting the query may have access controls associated with them. The access controls may comprise rights or permissions associated with the credentials and may be used to restrict access to data from the plurality of data domains. For example, the access controls may be used to determine data from the plurality of data domains to which access is granted and/or data from the plurality of data domains to which access should not be granted.

The determining of the particular information from the plurality of data domains may comprise not determining information which is restricted based on the access controls. For example, the access controls may indicate that some information from the plurality of data domains should not be included in a response to the query (e.g., it may include information which is restricted for a user inputting the query). Access to such information may be restricted and may not be determined as part of the particular information.

The determining of the particular information from the plurality of data domains may comprise determining information which includes information which is not restricted based on the access controls. For example, the access controls may indicate that some information from the plurality of data domains can be included in a response to the query (e.g., it does not include information which is restricted for a user inputting the query).

The access controls may serve to provide a technical effect of improving the security and integrity of the enterprise information environment. This differs from other model based (e.g., generative artificial intelligence based) response systems which may suffer from information leakage as information and data are ingested into models and/or during the training of models with no or limited traceability or security controls.

The natural language output based on the particular information is dependent on the technical functioning of the one or more data models and/or the one or more generative artificial intelligence models. The one or more data models and/or the one or more generative artificial intelligence models may have been trained using a machine learning algorithm. The operation of the one or more data models and/or the one or more generative artificial intelligence models in determining the particular information and/or the natural language output may therefore be based on parameters which the one or more data models and/or one or more generative artificial intelligence models have learned through training (as opposed to parameters which have been set by a human programmer). The one or more data models and/or the one or more generative artificial intelligence models may be implemented in dedicated hardware. Additionally or alternatively, the one or more data models and/or the one or more generative artificial intelligence models may comprise emulation of one or more data models and/or one or more generative artificial intelligence models in software.

The one or more data models and/or the one or more generative artificial intelligence models may have been configured through training based on training data. The training data may be different from the data from the one or more enterprise data sets. That is, the one or more data models and/or the one or more generative artificial intelligence models may not have been trained on data stored in the one or more enterprise data sets. This may prevent information leakage of data stored in the one or more enterprise data sets in outputs of the one or more data models, thereby improving the security and integrity of the enterprise data sets.

The query may comprise a natural language query received through a graphical user interface. The one or more enterprise data sets may include any of documents, document segments, and insights generated by the one or more artificial intelligence applications. Each of the relevance scores may be associated with a respective portion of the one or more enterprise data sets, and each of the relevance scores is determined relative to the other respective portions of the one or more enterprise data sets.

It is noted that the above-described functionality has been provided by way of non-limiting example and other techniques may be used to generate queries and commands. For example, in additional or alternative implementations, multimodal or generative pre-trained transformers, which is an autoregressive language model that uses deep learning to produce human-like text, may be used to generate a query from the search input (i.e., without use of a seed bank). To illustrate, suppose the search input was "What are the riskiest motor actuators at Tinker?". As in the technique described above, the search input may be subjected to entity extraction and mapping, which would result in an entity matched search input of "What are the riskiest WUC 11AAF at Location AFB0123?." Input is subjected to embedding and vectorization, with a large language model being used for query generation. The entity matched search input may be provided to the generative multimodal or large language model algorithm to generate the query. In such an implementation, a generative multimodal algorithm may be provided with contextual information, such as a schema of metadata defining table headers, field descriptions, and joining keys, which may be used to retrieve the search results. For example, the schema may be used to translate the entity matched search input into a query (e.g., an SQL query).

The system may leverage characteristics of a model driven architecture, which represent system objects (e.g., components, functionality, data, etc.) using rich and descriptive metadata, to dynamically generate queries for conducting searches across a wide range of data domains (e.g., documents, tabular data, insights derived from AI applications, web content, or other data sources). Furthermore, the query modules of embodiments may be particularly well suited to searches involving type systems, which expose objects through metadata. Accordingly, the query modules disclosed herein represent an improvement in the field of query modules and provide a mechanism for rapidly deploying search functionality across a wide variety of data domains relative to existing query modules, which are typically limited with respect to their searchable data domains (e.g., web query modules are limited to web content, file system query modules are limited to searches of a file system, and so on).

The method may further comprise determining validation data for the particular information from the plurality of different data domains. The validation data may comprise or otherwise be indicative of data from the one or more enterprise data sets on which determined particular information is based. For example, the validation data may comprise or otherwise be indicative of any of documents, document segments, and insights of the respective portions of the one or more enterprise data sets on which the potential responses are based.

The determining of the validation data may provide traceability and transparency as to the data on which the natural language output based on the particular information is provided, thereby improving the integrity of the output. For example, the validation data may allow an output to be checked against the sources of information on which it is based. The validation data may further allow transparency as to the operation of the one or more data models and/or one or more generative artificial intelligence models and may allow insight into the internal functioning of the models.

The method may further comprise outputting determined validation data. Outputting the determined validation data may comprise displaying a representation of the validation data on an electronic display and/or transmitting the validation data to a computing device for display at the computing device. The method may further comprise generating a traceability analysis of the natural language output, the traceability analysis indicating any of the documents, the document segments, and the insights of the respective portions of the one or more enterprise data sets. The traceability analysis may be based on determined validation data. The method may further comprise outputting the generated traceability analysis. For example, the generated traceability analysis may be transmitted to a computing device for display at the computing device.

Each data model of the plurality of data models may correspond to a different data domain of the plurality of different data domains. Each data model may represent respective relationships and attributes of the corresponding different data domain of the plurality of different data domains. The respective relationships and attributes may include any of data types, data formats, and industry-specific information. The natural language output may comprise a summary of at least one of the respective portions of the one or more enterprise data sets associated with a relevance score. The method may further comprise embedding respective objects in the plurality of the different data domains of the enterprise information environment, wherein the respective objects enable the one or more enterprise access control protocols.

The enterprise access control protocols may include user role-based enterprise access control protocols. The enterprise access control protocols may cause a first user with a first user role to be presented with a different natural language output relative to a second user with a second user role. The enterprise access control protocols may cause any of: preventing the presentation of at least a portion of the natural language output; preventing at least of a portion of the particular information from the relevant data domains from being used to generate the natural language output; and preventing, prior to the identification, access to any of particular enterprise data sets, particular artificial intelligence applications, particular data models, and particular data domains of the enterprise information environment.

The generative artificial intelligence models may be separated from the enterprise data of the enterprise information environment, and the separation may include the generative artificial intelligence models not being trained on the enterprise data of the enterprise information environment. The generative artificial intelligence models may be trained on domain data associated with the different domains, wherein the domain data does not include enterprise data of the enterprise information environment.

The natural language output may comprise a deterministic response caused at least in part by the separation of the generative artificial intelligence models from the enterprise data of the enterprise information environment. The separation of the generative artificial intelligence models from the enterprise data of the enterprise information environment may reduce hallucination and information leakage of the generative artificial intelligence models relative to other generative artificial intelligence models that have been trained on other enterprise data of other enterprise information environments.

According to examples disclosed herein there is provided a computer implemented method comprising: processing a query input; identifying, based on the query input, one or more artificial intelligence applications and a plurality of associated data models from a plurality of data domains; analyzing the query input based on the data models from the plurality of data domains; determining, by a machine learning model, a relevance score based on the analysis of the query input; generating, based on the relevance score, one or more query sets for execution on at least one of the one or more artificial intelligence applications; and composing a response output based on results of the executed one or more generated query sets.

The method may comprise generating a representation of the response output for display on an electronic display. The method may comprise displaying a representation of the response output on an electronic display. The method may comprise transmitting the response output to a computing device for display at the computing device.

The composing a response output based on results of the executed one or more generated query sets is dependent on the technical functioning of the one or more data models, the one or more machine learning models and/or the one or more artificial intelligence applications. The one or more data models, the one or more machine learning models and/or the one or more artificial intelligence applications may have been trained using a machine learning algorithm. The operation of the one or more data models, the one or more machine learning models and/or the one or more artificial intelligence applications may therefore be based on parameters which have been learned through training (as opposed to parameters which have been set by a human programmer). The one or more data models, the one or more machine learning models and/or the one or more artificial intelligence applications may be implemented in dedicated hardware. Additionally, or alternatively, the one or more data models, the one or more machine learning models and/or the one or more artificial intelligence applications may comprise emulation of the one or more data models, the one or more machine learning models and/or the one or more artificial intelligence applications in software.

The one or more data models, the one or more machine learning models and/or the one or more artificial intelligence applications may have been configured through training based on training data. The training data may be different from data in the plurality of data domains. That is, the one or more data models, the one or more machine learning models and/or the one or more artificial intelligence applications may not have been trained on data from the plurality of data domains. This may prevent information leakage of data stored from the plurality of data domains, thereby improving the security and integrity of the enterprise data sets.

Processing the query input may comprise any of data modeling feature inspection and machine learning model simulations to select one or more analysis channels. The response output may comprise any of predictions, insights, or recommendations from the associated artificial intelligence applications. The response output may comprise any of a report or dynamically configured dashboards based on any of the predictions, insights, or recommendations from the associated artificial intelligence applications. The one or more query sets generated to run on the associated artificial intelligence applications may be configured to address a range of different artificial intelligence applications and data sets. The one or more query sets configured for the range of different artificial intelligence applications and data sets are based on a type system to define types for use by the different artificial intelligence applications. The results of one or more generated query sets may relate to multiple different artificial intelligence applications, and the results can include newly generated insights from the multiple different artificial intelligence applications. Processing a query input may comprise natural language processing (NLP) with vectorized data and can generate pre-trained transformers that are fine-tuned or re-trained on specific data tailored to the type of query for an associated artificial intelligence application.

According to examples disclosed herein there is provided a computer implemented method comprising: receiving an enterprise search query, wherein the enterprise search query comprises a natural language input; retrieving, based on the enterprise search query and one or more retriever models, a plurality of data records associated with at least a portion of enterprise data of an enterprise information environment; determining, by the one or more retriever models, a respective relevance score for each of the retrieved data records; selecting, based on the respective relevance scores, at least one of the retrieved data records; selecting, based on one or more enterprise access control protocols, at least a portion of at least one of the retrieved data records; determining, by one or more large language models based on the at the least one selected portion, an enterprise access-controlled natural language output; and facilitating presentation of the enterprise access-controlled natural language output.

Facilitating presentation of the natural language output may comprise generating a representation of the natural language output for display on an electronic display. Facilitating presentation of the natural language output may comprise displaying a representation of the natural language output on an electronic display. Facilitating presentation of the natural language output may comprise transmitting the natural language output to a computing device for display at the computing device.

The one or more enterprise access control protocols may comprise control protocols associated with credentials (e.g., user credentials and/or user profile) associated with an input of the search query. For example, the search query may be input at a computing device by a user who is logged into or otherwise accessing a system or device using credentials, such as user credentials (e.g., login credentials). The credentials used in inputting the query may have access controls associated with them. The access controls may comprise rights or permissions associated with the credentials and may be used to restrict access to data from the data records. For example, the access controls may be used to determine data from the data records to which access is granted and/or data from the data records to which access should not be granted. The selecting, based on one or more enterprise access control protocols, at least a portion of at least one of the retrieved data records, may comprise selecting information which is not restricted based on the one or more enterprise access control protocols.

Selecting, based on one or more enterprise access control protocols, the at least a portion of at least one of the retrieved data records and then using the one or more large language models to determine the enterprise access-controlled natural language output based on the selected at least a portion of at least one of the retrieved data records, may mean that only data which has been selected based on the access control protocols is provided to the large language model. A large language model may incorporate probabilistic methods such that portions of an output of the large language model may be difficult to trace to specific inputs. By restricting the input which is provided to a large language model to only include information selected based on access protocols, the large language model does not generate outputs based on any data or information to which access is not permitted by the access control protocols. This can avoid the output of the large language model inadvertently being based on data or information to which access is not permitted by the access control protocols.

The access control protocols may serve to provide a technical effect of improving the security and integrity of the data stores. This differs from other model based (e.g., generative artificial intelligence based) response systems which may suffer from information leakage as information and data are ingested into models and/or during the training of models with no or limited traceability or security controls.

The determining, by one or more large language models based on the at the least one selected portion, an enterprise access-controlled natural language output may comprise providing the at least one selected portion to the large language model as an input to the large language model. The selecting, based on one or more enterprise access control protocols, at least a portion of at least one of the retrieved data records may comprise restricting at least a portion of the at least one of the retrieved data records from being included in the at least a portion of at least one of the retrieved data records. Within the scope of this application it is expressly intended that the various aspects, embodiments, examples and alternatives set out in the preceding paragraphs, in the claims and/or in the description and drawings, and in particular the individual features thereof, may be taken independently or in any combination. That is, all examples and/or features of any example can be combined in any way and/or combination, unless such features are incompatible.

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. Thus, for example, the enterprise generative artificial intelligence systems 302 and 400 are each depicted as a single system in the examples of FIGS. 3 and 4, however they may also each be implemented as multiple systems. These and other variations, modifications, additions, and improvements fall within the scope of the subject matter herein.

The present invention(s) are described above with reference to example embodiments. It will be apparent to those skilled in the art that various modifications may be made, and other embodiments may be used without departing from the broader scope of the present invention(s). Therefore, these and other variations upon the example embodiments are intended to be covered by the present invention(s).

What is claimed is:

1. A method comprising:
generating a set of potential responses to a prompt using one or more data models with data from at least a plurality of data domains of an enterprise information environment that includes access controls, wherein generating the set of potential responses uses at least one large language model trained on the at least the plurality of data domains of the enterprise information environment to determine data object semantics, and wherein the at least one large language model includes vectorized data from the data from the at least the plurality of data domains with embeddings;
determining validation data for the set of potential responses, wherein the validation data is from the at least the plurality of data domains of the enterprise information environment, wherein determining the validation data comprises retrieving the embeddings from the vectorized data;
selecting a deterministic response from the set of potential responses based on scoring of the validation data and restricting the deterministic response based on the access controls in view of profile information associated with the prompt, wherein selecting the deterministic response from the set of potential responses comprises using the embeddings from the vectorized data to determine relevance evaluations; and
outputting the selected deterministic response with the validation data corresponding to the selected deterministic response.

2. The method of claim 1, further comprising:
generating a traceability analysis of the validation data, the traceability analysis indicating any of documents, document segments, and insights of at least a portion of one or more enterprise data sets.

3. The method of claim 1, wherein the scoring of the validation data comprises:
determining, based on the one or more data models, a plurality of relevance scores associated with at least a portion of each piece of validation data for the set of potential responses.

4. The method of claim 1,
wherein at least two of the data domains include industry-specific data for different industries, wherein at least one response of the set of potential responses uses a first data domain of the at least the plurality of data domains, and wherein at least another response of the set of potential responses uses a second data domain of the at least the plurality of data domains,
wherein the one or more data models comprises multiple models trained for different data domains with industry-specific data of the at least the plurality of data domains,
wherein each data model represents respective relationships and attributes of the corresponding different data domain industry-specific data of the different data domains, and
wherein the respective relationships and attributes include any of data types, data formats, and industry-specific information.

5. The method of claim 1, wherein the one or more data models include multimodal models wherein at least one is a large language model.

6. The method of claim 1, wherein the access controls enforce restrictions including at least one of administrative policies, security policies, profile rights, and organizational controls.

7. The method of claim 1, wherein the access controls cause a different deterministic response to be selected based on profiles with different access rights.

8. The method of claim 1, wherein the access controls cause a different validation data to be output based on profiles with different access rights.

9. The method of claim 1, wherein the selected deterministic response comprises at least one of predictions, insights, or recommendations from an artificial intelligence application.

10. The method of claim 1, wherein the output includes at least one of data visualization, automated control and instruction, a report, and a dynamically configured dashboard.

11. The method of claim 1, wherein generating the set of potential responses using the one or more data models comprises using a retrieval model to determine relevant objects from the at least the plurality of data domains of the enterprise information environment.

12. The method of claim 1, wherein the data object semantics are for enterprise concepts, features, and components.

13. The method of claim 1,
wherein the one or more data models uses a model driven architecture with a type system for disparate data formats of the at least the plurality of data domains, and
wherein determining the validation data uses the type system of the model driven architecture for access controls of the validation data in view of the profile information associated with the prompt.

14. The method of claim 1, wherein outputting the selected deterministic response includes a generative AI insight and a traceability report indicating at least one source document used to determine the selected deterministic response, and wherein the at least one source document is from a particular data domain of the at least the plurality of data domains of the enterprise information environment.

15. A system comprising:
one or more processors; and
memory storing instructions that, when executed by the one or more processors, cause the system to perform:
generating a set of potential responses to a prompt using one or more data models with data from at least a plurality of data domains of an enterprise information environment that includes access controls, wherein generating the set of potential responses uses at least one large language model trained on the at least the plurality of data domains of the enterprise information environment to determine data object semantics, and wherein the at least one large language model includes vectorized data from the data from the at least the plurality of data domains with embeddings;
determining validation data for the set of potential responses, wherein the validation data is from the at least the plurality of data domains of the enterprise information environment, wherein determining the validation data comprises retrieving the embeddings from the vectorized data;
selecting a deterministic response from the set of potential responses based on scoring of the validation data and restricting the deterministic response based on the access controls in view of profile information associated with the prompt; wherein selecting the deterministic response from the set of potential responses comprises using the embeddings from the vectorized data to determine relevance evaluations; and
outputting the selected deterministic response with the validation data corresponding to the selected deterministic response.

16. The system of claim 15, further comprising:
generating a traceability analysis of the validation data, the traceability analysis indicating any of documents, document segments, and insights of at least a portion of one or more enterprise data sets.

17. The system of claim 15, wherein the scoring of the validation data comprises:

determining, based on the one or more data models, a plurality of relevance scores associated with at least a portion of each piece of validation data for the set of potential responses.

18. The system of claim 15, wherein the one or more data models include multimodal models wherein at least one is a large language model.

19. The system of claim 15, wherein the access controls enforce restrictions including at least one of administrative policies, security policies, profile rights, and organizational controls.

20. The system of claim 15, wherein the access controls cause a different deterministic response to be selected based on profiles with different access rights.

21. The system of claim 15, wherein the access controls cause a different validation data to be output based on profiles with different access rights.

22. The system of claim 15, wherein the selected deterministic response comprises at least one of predictions, insights, or recommendations from an artificial intelligence application.

23. The system of claim 15, wherein the output includes at least one of data visualization, automated control and instruction, a report, and a dynamically configured dashboard.

24. A non-transitory computer readable medium comprising instructions that, when executed, cause one or more processors to perform:

generating a set of potential responses to a prompt using one or more data models with data from at least a plurality of data domains of an enterprise information environment that includes access controls, wherein generating the set of potential responses uses at least one large language model trained on the at least the plurality of data domains of the enterprise information environment to determine data object semantics, and wherein the at least one large language model includes vectorized data from the data from the at least the plurality of data domains with embeddings;

determining validation data for the set of potential responses, wherein the validation data is from the at least the plurality of data domains of the enterprise information environment, wherein determining the validation data comprises retrieving the embeddings from the vectorized data;

selecting a deterministic response from the set of potential responses based on scoring of the validation data and restricting the deterministic response based on the access controls in view of profile information associated with the prompt, wherein selecting the deterministic response from the set of potential responses comprises using the embeddings from the vectorized data to determine relevance evaluations; and outputting the selected deterministic response with the validation data corresponding to the selected deterministic response.

* * * * *